US011236609B2

(12) United States Patent
McDaniel

(10) Patent No.: US 11,236,609 B2
(45) Date of Patent: Feb. 1, 2022

(54) APPARATUSES, SYSTEMS, AND METHODS FOR DYNAMIC PROPPANT TRANSPORT FLUID TESTING

(71) Applicant: PfP INDUSTRIES, LLC, Houston, TX (US)

(72) Inventor: Robert Ray McDaniel, Houston, TX (US)

(73) Assignee: PfP INDUSTRIES LLC, Houston, TX (US)

( * ) Notice: Subject to any disclaimer, the term of this patent is extended or adjusted under 35 U.S.C. 154(b) by 0 days.

(21) Appl. No.: 16/692,378

(22) Filed: Nov. 22, 2019

(65) Prior Publication Data

US 2020/0190978 A1 Jun. 18, 2020

Related U.S. Application Data

(60) Provisional application No. 62/770,871, filed on Nov. 23, 2018.

(51) Int. Cl.
*E21B 49/08* (2006.01)
*G01N 1/38* (2006.01)
*B01F 15/00* (2006.01)

(52) U.S. Cl.
CPC ........ *E21B 49/08* (2013.01); *B01F 15/00376* (2013.01); *G01N 1/38* (2013.01); *B01F 2215/0081* (2013.01); *E21B 49/0875* (2020.05)

(58) Field of Classification Search
CPC ....... E21B 49/08; E21B 49/0875; G01N 1/38; G01N 11/14; B01F 15/00376; B01F 2215/0081
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,873,251 A | 9/1956 | Jones, Jr. | |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |

(Continued)

FOREIGN PATENT DOCUMENTS

| | | |
|---|---|---|
| WO | 2013124003 A1 | 8/2013 |
| WO | 2014191389 A1 | 4/2014 |
| WO | 2018025010 A1 | 2/2018 |

OTHER PUBLICATIONS

U.S. Appl. No. 12/075,461, filed Mar. 11, 2008, Gatlin et al.

(Continued)

*Primary Examiner* — David Z Huang
(74) *Attorney, Agent, or Firm* — Robert W. Strozier

(57) ABSTRACT

Apparatuses and systems and methods implementing the apparatuses and systems include a blender base unit having an rpm sensor and the methods determines a minimum rpm value that is converted to a shear rate, a fluid velocity rate, and an estimated maximum fracture width.

24 Claims, 4 Drawing Sheets

(56) References Cited

U.S. PATENT DOCUMENTS

| | | | |
|---|---|---|---|
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,462,718 A | 7/1984 | McLaughlin et al. | |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 4,985,154 A * | 1/1991 | Balzer | C09K 8/60 507/211 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,310,002 A * | 5/1994 | Blauch | C09K 8/58 166/305.1 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffee et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,549,840 A | 8/1996 | Mondin et al. | |
| 5,551,516 A | 9/1996 | Norman et al. | 166/308.2 |
| 5,558,171 A | 9/1996 | McGlothlin et al. | |
| 5,593,958 A | 1/1997 | Mondin et al. | |
| 5,599,785 A | 2/1997 | Mondin et al. | |
| 5,610,130 A | 3/1997 | Barbara et al. | |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,716,925 A | 2/1998 | Mondin et al. | |
| 5,722,490 A | 3/1998 | Ebinger | 166/281 |
| 5,725,470 A * | 3/1998 | Lazarowitz | B09C 1/02 134/25.1 |
| 5,731,281 A | 3/1998 | Mondin et al. | |
| 5,741,760 A | 4/1998 | Mondin et al. | |
| 5,744,024 A | 4/1998 | Sullivan, III et al. | 208/236 |
| 5,755,286 A | 5/1998 | Ebinger | 166/281 |
| 5,759,983 A | 6/1998 | Mondin et al. | |
| 5,763,386 A | 6/1998 | Mondin et al. | |
| 5,775,425 A | 7/1998 | Weaver et al. | 166/276 |
| 5,776,880 A | 7/1998 | Mondin et al. | |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,830,831 A * | 11/1998 | Chan | B01F 17/0085 507/211 |
| 5,833,000 A | 11/1998 | Weaver et al. | 166/276 |
| 5,853,048 A | 12/1998 | Weaver et al. | 166/279 |
| 5,854,193 A | 12/1998 | Mondin et al. | |
| 5,861,367 A | 1/1999 | Blanvalet et al. | |
| 5,871,049 A | 2/1999 | Weaver et al. | 166/276 |
| 5,874,386 A * | 2/1999 | Chan | C09K 8/524 507/211 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,952,281 A | 9/1999 | Mondin et al. | |
| 5,964,295 A | 10/1999 | Brown et al. | 166/308.2 |
| 5,977,032 A * | 11/1999 | Chan | C09K 8/52 507/211 |
| 5,979,557 A | 11/1999 | Card et al. | 166/300 |
| 5,980,845 A | 11/1999 | Cherry | 423/229 |
| 5,985,814 A | 11/1999 | Zocchi et al. | |
| 6,000,412 A * | 12/1999 | Chan | C11D 11/0041 134/22.14 |
| 6,016,871 A | 1/2000 | Burts, Jr. | 166/300 |
| 6,017,868 A | 1/2000 | Mondin et al. | |
| 6,020,296 A | 2/2000 | Mertens et al. | |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,090,754 A * | 7/2000 | Chan | B01F 17/0085 507/110 |
| 6,112,814 A * | 9/2000 | Chan | C09K 8/524 134/22.19 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,191,090 B1 | 2/2001 | Mondin et al. | |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |

(56) References Cited

U.S. PATENT DOCUMENTS

| | | |
|---|---|---|
| 6,291,405 B1 | 9/2001 | Lee et al. ............... 507/136 |
| 6,330,916 B1 | 12/2001 | Rickards et al. ......... 166/280.2 |
| 6,436,880 B1 | 8/2002 | Frenier |
| 6,725,931 B2 | 4/2004 | Nguyen et al. ........... 166/280.2 |
| 6,756,345 B2 | 6/2004 | Pakulski et al. .......... 507/246 |
| 6,793,018 B2 | 9/2004 | Dawson et al. ........... 166/300 |
| 6,832,650 B2 | 12/2004 | Nguyen et al. ........... 166/279 |
| 6,875,728 B2 | 4/2005 | Gupta et al. ............. 507/240 |
| 6,911,417 B2* | 6/2005 | Chan ...................... C09K 8/52 166/311 |
| 7,012,043 B2 | 3/2006 | Klein et al. |
| 7,087,554 B2 | 8/2006 | Youngson et al. |
| 7,140,433 B2 | 11/2006 | Gatlin et al. ............ 166/250.01 |
| 7,268,100 B2 | 9/2007 | Kippie et al. ............ 507/244 |
| 7,350,579 B2 | 4/2008 | Gatlin et al. ............ 166/308.3 |
| 7,601,675 B2 | 10/2009 | Poelker et al. |
| 7,989,404 B2 | 8/2011 | Kakadjian et al. ........ 507/261 |
| 8,097,567 B2 | 1/2012 | Wilson, Jr. |
| 9,034,801 B2 | 5/2015 | Merli et al. |
| 9,868,896 B2* | 1/2018 | Mahoney ............... C09K 8/62 |
| 2002/0049256 A1 | 4/2002 | Bergeron, Jr. ........... 514/674 |
| 2002/0165308 A1 | 11/2002 | Kinniard et al. ......... 524/492 |
| 2003/0166472 A1* | 9/2003 | Pursley .................. C09K 8/28 507/200 |
| 2003/0220204 A1 | 11/2003 | Baran, Jr. et al. ........ 507/200 |
| 2005/0045330 A1 | 3/2005 | Nguyen et al. ........... 166/281 |
| 2005/0092489 A1 | 5/2005 | Welton et al. ........... 166/280.2 |
| 2005/0137114 A1 | 6/2005 | Gatlin et al. ............ 510/424 |
| 2005/0153846 A1 | 7/2005 | Gatlin ................... 208/236 |
| 2005/0250666 A1 | 11/2005 | Gatlin et al. ............ 510/492 |
| 2006/0194700 A1 | 8/2006 | Gatlin et al. ............ 507/203 |
| 2007/0032693 A1 | 2/2007 | Gatlin et al. ............ 507/239 |
| 2007/0125536 A1 | 6/2007 | Acock et al. |
| 2007/0129257 A1 | 6/2007 | Kippie et al. ............ 507/102 |
| 2007/0131425 A1 | 6/2007 | Gatlin et al. ............ 166/280.2 |
| 2007/0173413 A1 | 7/2007 | Lukocs et al. ........... 507/238 |
| 2007/0173414 A1 | 7/2007 | Wilson ................... 507/131 |
| 2008/0039345 A1 | 2/2008 | Kippie et al. ............ 507/213 |
| 2008/0269082 A1 | 10/2008 | Wilson et al. |
| 2008/0287323 A1 | 11/2008 | Li et al. |
| 2010/0018294 A1* | 1/2010 | Tonmukayakul ...... G01N 11/14 73/54.28 |
| 2010/0224365 A1 | 9/2010 | Adad |
| 2010/0248997 A1 | 9/2010 | Li et al. |
| 2010/0307757 A1 | 12/2010 | Blow et al. |
| 2011/0017677 A1 | 1/2011 | Evans |
| 2011/0082057 A1 | 4/2011 | Zhang et al. |
| 2012/0125617 A1 | 5/2012 | Gu et al. |
| 2012/0305254 A1 | 12/2012 | Chen et al. |
| 2013/0153233 A1 | 6/2013 | Bell et al. |
| 2013/0157905 A1 | 6/2013 | Saini et al. |
| 2013/0213657 A1 | 8/2013 | Dobson, Jr. et al. |
| 2013/0333888 A1 | 12/2013 | Rincon-Torres |
| 2014/0116710 A1 | 5/2014 | Naser-El-Din et al. |
| 2014/0158354 A1 | 6/2014 | Kumar et al. |
| 2014/0174742 A1 | 6/2014 | Mirakyan et al. |
| 2014/0194327 A1 | 7/2014 | Hutchings et al. |
| 2014/0196904 A1 | 7/2014 | Fontenelle et al. |
| 2014/0374104 A1 | 12/2014 | Seth et al. |
| 2015/0013987 A1 | 1/2015 | Underwood et al. |
| 2015/0068747 A1 | 3/2015 | Hwang et al. |
| 2015/0129231 A1 | 5/2015 | Vitiur et al. |
| 2015/0299554 A1 | 10/2015 | Pakulski et al. |
| 2015/0344767 A1 | 12/2015 | Lei et al. |
| 2015/0353807 A1 | 12/2015 | Witham et al. |
| 2017/0295997 A1* | 10/2017 | Kolar .................... A47J 43/042 |
| 2018/0030335 A1 | 2/2018 | McEwen et al. |

OTHER PUBLICATIONS

Lower Cost Methods for Improved Oil Recovery (IOR) Via Surfactant Flooding, William A. Goddard III ; Yongchun Tang ; Patrick Shuler ; Mario Blanco ; Seung Soon Jang ; Shiang-Tai Lin ; Prabal Maiti ; Yongfu Wu ; Stefan Iglauer ; Xiaohang Zhang.

* cited by examiner

APPARATUSES, SYSTEMS, AND METHODS FOR DYNAMIC PROPPANT TRANSPORT FLUID TESTING

RELATED APPLICATIONS

This application claims the benefit of and priority to U.S. Provisional Patent Application Ser. No. 62/770,871 filed Nov. 23, 2018 (23 Nov. 2019).

BACKGROUND OF THE DISCLOSURE

1. Field of the Disclosure

Embodiments of the present disclosure relate to apparatuses, systems, and methods for dynamic testing of water fracturing fluid properties, predicting fracturing fluid properties downhole, and improving fracturing fluid designs.

In particular, embodiments of the present disclosure relate to apparatuses, systems, and methods for dynamic testing of fracturing fluid properties and predicting fracturing designs, wherein the apparatuses and systems include a blender apparatus equipped with a rpm sensor and the methods are designed to simulate fracturing fluid behavior under fracturing conditions using room temperature data from the apparatuses of this disclosure.

2. Description of the Related Art

The majority of formations being produced today may be characterized as having low natural permeability. Historically these formations respond best to fracturing treatment designs that produce long, relatively narrow propped fractures. The key to improving a formation's response to a fracturing treatment is to execute the treatment design in such a way as to maximize the amount of created fracture area that is left propped open.

In an effort to control completion costs and still create the desired fracture geometry, the industry has moved to utilizing thin fracturing fluids that generate the fracture geometry through a combination of low fracturing fluid viscosity and high fracturing fluid injection rates. This type of treatment design has come to be described as a "slick water frac". Although this approach has helped control completion costs while still being an effective way to improve well productivity, this approach has certain limitations. Slick water fluids generally support only limited proppant concentrations while still allowing treatment to go to completion. Slick water fluids generally limit the size of proppant that may be placed into fractures. Increasing propped fracture lengths using slick water fluids generally requires increasing the treatment size. High pump rates are generally required when utilizing slick water fluids to successfully complete the fracturing treatment making it more difficult to contain fracturing to a targeted formation. High pump rates generally required utilizing slick water fluids may lead to excessive wear on pumping equipment and tubular goods. Many slick water fluid treatments currently require large amounts of predominantly fresh water. Well response to a slick water treatment may often be characterized as a good initial response followed by a fairly rapid decline, a result that may be attributed to a limited propped fracture area/length.

Ideally all of the above issues could be addressed if there was a way to significantly improve proppant transport and placement without having to resort to the expense and undesirable changes in fracture geometry (e.g., shorter/wider created fractures) that accompany the use of high viscosity conventional cross-linked fracturing fluids. Thus, there is still a need in the art for improved apparatuses, systems, and methods embodying new approaches to measure dynamic fracturing fluid transport properties and linking these properties with fluid rheology properties to model fracturing effectiveness and efficiency leading to more effective and efficient fracturing fluids and/or fracturing methods and designs including slick water fracturing fluids, viscosified fracturing fluids, and linear gel fracturing fluids.

SUMMARY OF THE DISCLOSURE

Apparatuses

Embodiments of this disclosure provide apparatuses including (1) a blender unit comprising (a) a base unit including a motor, a blender control unit having a processing unit and a display unit, and (b) a jar unit including a jar, a base, and a blade assembly. The apparatus also includes (2) an rpm unit including an rpm sensor, an rpm control unit, and a rpm display unit, and (3) a power supply adapted to supply power to the apparatus components that required power, wherein the apparatuses are adapted to generate room temperature data that mimics downhole fracturing fluid properties, downhole fracturing fluid behavior, and downhole proppant transport properties of fracturing fluids.

Embodiments of this disclosure provide apparatuses including (1) a blender base unit comprising a motor including an rpm sensor, a blender control unit including a processing unit and a display unit, (2) a jar unit including a jar, a base, and a blade assembly, and (3) a power supply, wherein the apparatuses are adapted to generate room temperature data that mimics downhole fracturing fluid properties, downhole fracturing fluid behavior, and downhole proppant transport properties of fracturing fluids.

Method for Simulating Dynamic Rheological Properties

Embodiments of this disclosure provide a method including: (1) hydrating a sample of a fracturing fluid at room temperature at a hydrating rpm value for a hydrating period in a blender apparatus of this disclosure, wherein the hydrating period measured in seconds to simulate on-site hydration rates, (2) adding an amount of a proppant to form a slurry, (3) mixing the slurry at a mixing rpm value for a mixing period; (4) reducing the mixing rpm value to a hold rpm value for a hold period; (5) at the conclusion of the hold period, reducing the hold rpm value to an rpm value at which proppant visually settles; (6) increasing the rpm value to fluidize the settled proppant, then reducing the rpm value to a minimum rpm value that prevents proppant settling; (7) repeating step (6) to insure reproducibility; and (8) recording the minimum rpm value. In other embodiments, the methods further include (9) converting the minimum rpm value into a shear rate, (10) calculating a fluid velocity from the calculated shear rate, (11) calculating a pump rate from the fluid velocity, and (12) calculating a maximum fracture width. In certain embodiments, the hydrating rpm value is between about 1000 rpm and about 2000 rpm, between about 1250 and about 1750 rpm, or about 1250 and about 1500 rpm, but higher and lower values may be used, and the hydrating period is between about 5 s and about 20 s or between about 5 s and about 15 s or about 8 s and about 12 s, or about 10 s, but higher and lower values may be used. The mixing rpm value is between about 1000 rpm and about 2000 rpm, between about 1250 and about 1750 rpm, or about 1250 and about 1500 rpm, but higher and lower values may be used, the mixing period is between about 1 min and about 10 min. or between about 2 min. and about 6 min. or between about 3 min. and about 5 min., but higher and lower values be used. The hold rpm value is between about 500 rpm and about 1500 rpm, but higher and lower values be used, and the hold period is between about 30 min. and about 120 min or between about 45 min. and about 105 min. or between about 45 min. and about 90 min., but higher and lower values be used. In certain embodiments, the data may be used to adjust the fracturing fluid composition on the fly—during fracturing fluid blending, transporting through a tubular member, and/or during injecting into the formation to optimize proppant carrying capacity of the fracturing fluid.

Method for Measuring Viscosity Degradation after Undergoing a High Shear History Embodiments of this disclosure provide a method including: (1) hydrating a sample of a fracturing fluid at room temperature at a hydrating rpm value for a hydrating period in a blender apparatus of this disclosure, wherein the hydrating period measured in seconds to simulate on-site hydration rates; (2) adding an amount of a proppant to the fluid to form a slurry; (3) mixing the slurry at a mixing rpm value for a mixing period; (4) increasing the mixing rpm value to a high shear rpm value for a high shear period to mimic a high shear history encountered by a fracturing fluid being pumped down a tubular member and into a formation to be fractured; (5) at the conclusion of the high shear period, reducing the blender rpm value until proppant settles in the bottom of the blend jar; (6) fluidizing the settled proppant by increasing the blender rpm value; (7) reducing the blender rpm value to a minimum rpm value that just prevents proppant settling; (8) repeating the fluidizing step to insure reproducibility; and (9) recording the minimum rpm value. In certain embodiments, the hydrating rpm value is between about 1000 rpm and about 2000 rpm, between about 1250 and about 1750 rpm, or about 1250 and about 1500 rpm, but higher and lower values may be used, and the hydrating period is between about 5 s and about 20 s or between about 5 s and about 15 s or about 8 s and about 12 s, or about 10 s, but higher and lower values may be used. The mixing rpm value is between about 1000 rpm and about 2000 rpm, between about 1250 and about 1750 rpm, or about 1250 and about 1500 rpm, but higher and lower values may be used, the mixing period is between about 10 s and about 60 s or between about 20 s and about 40 s or about 30 s, but higher and lower values be used. The high shear rpm value is about 2500 rpm and about 5000 rpm or between about 3000 rpm to about 4500 rpm, but higher and lower rpm values be used, and the high shear period is between about 5 s and about 10 min or between about 30 s and about 7.5 min. or about 30 s and about 5 min., but higher and lower values may be used. In certain embodiments, the data may be used to adjust the fracturing fluid composition on the fly—during fracturing fluid blending, transporting through a tubular member, and/ or during injecting into the formation to optimize proppant carrying capacity of the fracturing fluid In certain embodiments, the method also includes: converting the minimum rpm value into a shear rate; calculating a fluid velocity from the calculated shear rate; calculating a pump rate from the fluid velocity; and calculating a maximum fracture width value.

In other embodiments, the method also includes: measuring the minimum rpm value of a plurality of fracturing fluids, each including a different additive composition; and comparing the minimum rpm values.

In other embodiments, the method also includes: measuring the calculated maximum fracture width values of a plurality of fracturing fluids, each including a different additive composition; and comparing the calculated maximum fracture width values.

In other embodiments, the method also includes: after the increasing step, measuring fluid properties to determine is the fluid properties have deteriorated, where the high shear history simulates fracturing fluid properties of fluids subjected to downhole conditions including high temperature downhole conditions.

In other embodiments, the method also includes: adjusting the high shear rpm value and the high shear period, and repeating the method steps, until the minimum rpm values and the calculated maximum fracture width values correspond to downhole conditions that simulate an actual well downhole conditions.

In other embodiments, the method also includes: measuring the minimum rpm value of a plurality of fracturing fluids, each including a different additive composition; and comparing the minimum rpm values to determine the fracturing fluid giving the best proppant transport for a set of downhole conditions of a specific well.

In other embodiments, the method also includes: measuring the minimum rpm value and the calculated maximum fracture width values of a plurality of fracturing fluids, each including a different additive composition; and comparing the minimum rpm values and the calculated maximum fracture width values to determine the fracturing fluid giving the best proppant transport for a set of downhole conditions of a specific well.

BRIEF DESCRIPTION OF THE DRAWINGS OF THE DISCLOSURE

The disclosure may be better understood with reference to the following detailed description together with the appended illustrative drawings in which like elements are numbered the same:

Figure 4A:
Figure 4B:
Figure 4C:
Figure 4D:

FIGS. 4A&D depict photographs of test sequence of sand settling using the compositions of this disclosure.

DEFINITIONS USED IN THE DISCLOSURE

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value. In other embodiments, the value is within ±0.01% of the stated value.

The term "gpt" means gallons per thousand gallons.
The term "rpm" means revolution per minute.
The term "bpm" means barrels per minute.
The term "ppg" means pounds per gallon.
The term "g" means grams.
The term "in" means inches.
The term "ft" means feet.
The term "V" means volume.
The term "A" means area.
The term "cA" means cross-sectional area.
The term "r" means radius.
The term "d or D" means diameter.
The term "s" means seconds.
The term "min." means minutes.
The term "hr" means hours.
The term "o.d." means outer diameter.
The term "i.d." means inner diameter.

When a range of values is given hererin, it should be recognized that explicit in the range given is that fact that the range also covers all subranges. Thus, a range of about 1 to 10 includes all subranges such as 1-9, 8, 7, 6, 5, 4, 3, 2 and all other subranges, integral or real in value.

DETAILED DESCRIPTION OF THE DISCLOSURE

The inventor has found that new apparatuses, systems, and methods implementing them may be constructed for measuring slick water fracture proppant transport properties and for designing improved fracturing fluid protocols or designs, such as slick water fracturing fluid protocols and viscosified fracturing fluid protocols or designs. The inventor has found that apparatuses for measuring fracturing fluid proppant transport properties maybe constructed using a bender equipped with an rpm sensors and readout, where the bender apparatus is used to simulate fracturing fluid proppant transport properties at different high shear and low shear conditions that mimic the fluid traveling to a formation to be fractured as well as the entry of fracturing fluid into the fractures for proppant depositions, which depends on the proppant transport properties of the fracturing fluid.

The inventor has found that there is a need to better understanding proppant transport and developing new ways to improve proppant transport of fracturing fluids including in slick water fracturing fluid applications and viscosified fracturing fluid applications. To understand the proppant transport properties of currently used additives/systems or to improve their properties, it is necessary to evaluate what factors play a role in proppant transport under downhole conditions. It is known that at least the following factors contribute to proppant transport: (1) fluid velocity; (2) fluid viscosity; (3) fluid structure, and (4) shear stability of the fracturing fluid. Thus, a simulation methodology should be able to measure these properties under simulated conditions and relate the measurement to downhole fluid behavior. The inventor believes that structure or lack of it may easily be the most important single characteristic into attaining improved proppant transport, while shear stability determines the fluid structure when reaches the fracture entrance. The shear history of the fluid may and often does degrade viscosity and degrade any structure that has been established to help transport proppant. The inventor designed the present methodology for fracturing fluid viscosity <100 cPs. This methodology is capable of predicting the behavior of slick water fracturing fluids, high molecular weight high viscosity fracturing fluids (e.g., polyacrylamides, hydratable cellulosic polymer, other similar polymer systems), linear gel fracturing fluids, and crosslinked fracturing fluids having a viscosity ≤100 cP.

In the development of new testing methods, one should be mindful that proppant transport is a dynamic process. That being the case, it is essential to develop a test procedure that makes realistic measurements of fluid transport properties under dynamic conditions that mimic downhole conditions. The inventor has found that the apparatuses, systems, and methods of this disclosure are capable of differentiating between proppant transport properties of current slick water fracturing fluids and additives/systems and modify them to achieve improve proppant transport capabilities. Once differences in dynamic transport properties are documented, rheological properties maybe used to predict the absence or presence of improved transport properties in any friction reducer or friction reducing composition to be evaluated.

This new test procedure of this disclosure was used to evaluate the transport properties of one friction reducer that are marketed as "standard" and three friction reducer additives that are identified as high viscosity (HiVis) friction reducers. After determining the transport properties of each friction reducer using the apparatuses, systems, and methods of this disclosure, the data may be used to validate the test results of the new dynamic transport test procedure of this disclosure by correlating the data with data generated using a rheology test procedure. The data from the new dynamic transport test procedure of this disclosure may also be adjusted to take into account friction reducer rheological properties "in the fracture". The data from the new dynamic transport test procedure of this disclosure may also be used to determine what rheologic al properties maybe linked to the ability (or inability) for a friction reducer/polymer system to contribute to dynamic proppant transport in the fracture. The methodology may also have application in linear gel fracturing fluids and in crosslinked fracturing fluids having a viscosity ≤100 cP.

Embodiments of this disclosure broadly relate to methods including hydrating a sample of a fracturing fluid at room temperature at a hydrating rpm value for a hydrating period in a blender apparatus comprising (a) a blender unit including (1) a base unit having (i) a motor, (2) a jar unit including (i) ajar, (ii) a base; and (iii) a blade assembly, (3) a control unit including: (i) a processing unit and (ii) a display unit, (4) an rpm sensor, (5) a power supply adapted to supply electrical power to the motor, the processing unit and the display unit. The methods also include adding an amount of a proppant to form a slurry and mixing the slurry at a mixing rpm value for a mixing period. The methods also include reducing the mixing rpm value to a hold rpm value for a hold period and at the conclusion of the hold period, reducing the hold rpm value to an rpm value at which proppant visually settles. The methods also include increasing the rpm value to fluidize the settled proppant, reducing the rpm value to a minimum rpm value that prevents proppant settling, repeating increasing and reducing steps to insure reproducibility, and recording the minimum rpm value.

In certain embodiments the methods further include converting the minimum rpm value into a shear rate, calculating a fluid velocity from the calculated shear rate, calculating a pump rate from the fluid velocity, and calculating a maximum fracture width value.

In other embodiments the methods further include measuring the minimum rpm value of a plurality of fracturing fluids, each including a different additive composition; and comparing the minimum rpm values of the plurality of fracturing fluids.

In other embodiments the methods further include measuring the calculated maximum fracture width values of the plurality of fracturing fluids, each including a different additive composition; and comparing the calculated maximum fracture width values.

In other embodiments the methods further include after the increasing step, measuring fluid properties to determine if the fluid properties have deteriorated, wherein a high shear history comprising the mixing rpm value and the hold rpm value to simulate fracturing fluid properties of each of the plurality of fracturing fluids subjected to downhole conditions including high temperature downhole conditions.

In other embodiments the methods further include adjusting the high shear rpm value and the high shear period; and repeating the method steps, until the minimum rpm values and the calculated maximum fracture width values correspond to downhole conditions so that the simulated values correspond to actual well downhole conditions.

In other embodiments the methods further include measuring the minimum rpm value of a plurality of fracturing fluids, each of the plurality of fracturing fluids including a different additive composition; and comparing the minimum rpm values of the plurality of fracturing fluids to determine the fracturing fluid giving the best proppant transport for a set of downhole conditions of a specific well.

In other embodiments the methods further include measuring the minimum rpm value and the calculated maximum fracture width values of the plurality of fracturing fluids, each of the plurality of fracturing fluids including a different additive composition; and comparing the minimum rpm values and the calculated maximum fracture width values of the plurality of fracturing fluids to determine the fracturing fluid giving the best proppant transport for a set of downhole conditions of a specific well.

Embodiments of this disclosure broadly relate to methods including hydrating a sample of a fracturing fluid at room temperature at a hydrating rpm value for a hydrating period in a blender apparatus comprising: a blender unit including a base unit having a motor; ajar unit having ajar; a base; and a blade assembly; a control unit having a processing unit; and a display unit; an rpm sensor; and a power supply adapted to supply electrical power to the motor, the processing unit and the display unit. The methods also include adding an amount of a proppant to the fluid to form a slurry and mixing the slurry at a mixing rpm value for a mixing period. The methods also include increasing the mixing rpm value to a high shear rpm value for a high shear period to mimic a high shear history encountered by a fracturing fluid being pumped down a tubular member and into a formation to be fractured and at the conclusion of the high shear period, reducing the blender rpm value until proppant settles in the bottom of the blend jar. The methods also includes fluidizing the settled proppant by increasing the blender rpm value; and reducing the blender rpm value to a minimum rpm value that just prevents proppant settling. The methods also include repeating the fluidizing step to insure reproducibility; and recording the minimum rpm value.

In certain embodiments the methods further include converting the minimum rpm value into a shear rate; calculating a fluid velocity from the calculated shear rate; calculating a pump rate from the fluid velocity; and calculating a maximum fracture width value.

In other embodiments the methods further include measuring the minimum rpm value of a plurality of fracturing fluids, each including a different additive composition; and comparing the minimum rpm values of the plurality of fracturing fluids.

In other embodiments the methods further include measuring the calculated maximum fracture width values of the plurality of fracturing fluids, each including a different additive composition; and comparing the calculated maximum fracture width values.

In other embodiments the methods further include after the increasing step, measuring fluid properties to determine if the fluid properties have deteriorated, wherein a high shear history comprising the mixing rpm value, the high shear rpm value, and the hold rpm value to simulate fracturing fluid properties of each of the plurality of fracturing fluids subjected to downhole conditions including high temperature downhole conditions.

In other embodiments the methods further include adjusting the high shear rpm value and the high shear period; and repeating the method steps, until the minimum rpm values and the calculated maximum fracture width values correspond to downhole conditions so that the simulated values correspond to actual well downhole conditions.

In other embodiments the methods further include measuring the minimum rpm value of a plurality of fracturing fluids, each of the plurality of fracturing fluids including a different additive composition; and comparing the minimum rpm values of the plurality of fracturing fluids to determine the fracturing fluid giving the best proppant transport for a set of downhole conditions of a specific well.

In other embodiments the methods further include measuring the minimum rpm value and the calculated maximum fracture width values of the plurality of fracturing fluids, each of the plurality of fracturing fluids including a different additive composition; and comparing the minimum rpm values and the calculated maximum fracture width values of the plurality of fracturing fluids to determine the fracturing fluid giving the best proppant transport for a set of downhole conditions of a specific well.

Embodiments of this disclosure broadly relate to apparatuses comprising a blender unit including: a base unit having a motor; ajar unit having ajar; a base; and a blade assembly; a control unit having a processing unit; and a display unit; an rpm sensor; and a power supply adapted to supply electrical power to the motor, the processing unit and the display unit, wherein the apparatus is configured to: (a) hydrate a sample of a fracturing fluid at room temperature at a hydrating rpm value for a hydrating, (b) mix the fracturing fluid and an amount of a proppant to form a slurry at a mixing rpm value for a mixing period; (c) reduce the mixing rpm value to a hold rpm value for a hold period; (d) at the conclusion of the hold period, reduce the hold rpm value to an rpm value at which proppant visually settles; (e) increase the rpm value to fluidize the settled proppant; (f) reduce the rpm value to a minimum rpm value that prevents proppant settling; (g) repeat increasing and reducing steps to insure reproducibility; and (h) record the minimum rpm value.

In certain embodiments the apparatuses are further configured to: convert the minimum rpm value into a shear rate; calculate a fluid velocity from the calculated shear rate; calculate a pump rate from the fluid velocity; and calculate a maximum fracture width value.

In other embodiments the apparatuses are further configured to increase the mixing rpm value to a high shear rpm value for a high shear period to mimic a high shear history encountered by a fracturing fluid being pumped down a tubular member and into a formation to be fractured.

In certain embodiments the apparatuses are further configured to after the increasing the mixing rpm value, measure fluid properties to determine if the fluid properties have deteriorated, wherein a high shear history comprising (a) the mixing rpm value and the hold rpm value or (b) the mixing rpm value, the high shear rpm value, and the hold rpm value to simulate fracturing fluid properties of each of the plurality of fracturing fluids subjected to downhole conditions including high temperature downhole conditions; adjusting the high shear rpm value and the high shear period; and repeat the method steps, until the minimum rpm values and the calculated maximum fracture width values correspond to downhole conditions so that the simulated values correspond to actual well downhole conditions.

Dynamic proppant transport testing is used to compare the ability of a fracturing fluid or additive to contribute to the transport of proppant after being subjected to a shear history that simulates what occurs during the travel through tubular goods from the wellhead to the entrance to the fracture. It can also be used to compare the effect that various additives may have to transport proppant through the surface equipment. Following the steps outlined the write-up sent to you a few days ago explained how the equipment and procedure could be altered to focus on transporting proppant through surface equipment as described herein.

To evaluate the ability of an additive to aid in transporting sand/proppant through surface equipment the dynamic transport test must incorporate a very short hydration period (to simulate the short time the polymer has in the blender unit that feeds the high pressure pumps).Residence time in the blender unit could be on the order of ±10 seconds. For a polymer to aid in proppant transport through the surface equipment it much generate a significant viscosity or structure rapidly so that it can aid in proppant transport from the blender unit, through the high pressure pumps and to the wellhead.

To evaluate this property two combinations of friction reducer and hydration methods were simulated. Two liquid emulsion friction reducers (a standard friction reducer FR and a high viscosity friction reducer) along with a dry form of a high viscosity friction reducer were evaluated. The dry FR was hydrated using a mixing unit known to accelerate the hydration of polymer in an aqueous solution. The hydration unit designed to minimize hydration time is produced by PfP Industries LLC and is known by the designation FR-EZ Unit. For an FR to assist in proppant transport through surface equipment it has to hydrate fast because it is in the blender for a very short time period (while sand is added) before going to the high pressure pumps. Below the hydration rates of a dry FR sent through a FR-EZ unit is compared to a standard slurry polymer.

The liquid polymer samples showed insufficient time to hydrate (in the 10 second mix period) to contribute to dynamic proppant suspension to the extent that when the RPM was reduced the sand sample was kept suspended. The dry polymer samples (hydrated with the FR-EZ unit) showed the ability to keep the proppant suspended (once the RPM was dropped) even when the high viscosity friction reducer was tested at a reduced concentration.

If the intent is to evaluate the capability of a fracturing fluid/additive to resist shear degradation and maintain the ability to contribute to proppant transport in the fracture, then you replace the short time period used for mixing/shearing show above with a calculated shear history that simulates both the time interval and shear rate that the fracturing fluid/slurry is subjected to during the pumping operation. Shear rate is a function of pipe ID and anticipated fluid velocity. The time interval is a function of total tubular length (depth+lateral length) divided by fluid velocity. Once the shear history is calculated it can be incorporated into the test procedure as follows:

Using a 250 mL sample size, hydrate the friction reducer/fracturing system (to be tested) for specified time at 1200 RPM (a sample size should be chosen with regard to keeping the top of the sample volume relatively close to the blades to insure that the shear is uniform with respect to the total sample volume being tested).

Add 60 gm of the proppant to be tested (equivalent to 2 ppg) and mix for 30 seconds. Increase shear rate (for the predetermined time) to achieve the calculated high shear history.

At the conclusion of the high shear history, reduce the blender RPM until build-up of proppant (on the bottom of blend jar) is visible.

Increase RPM to fluidize the settled proppant and then start to decrease the RPM to again find the minimum RPM to prevent proppant build-up. Continue to repeat this process to insure that a reproducible result has been obtained. Record the lowest RPM reading that does not cause sand build-up.

Comparing the minimum RPM recorded in Step #6 to the minimum number obtained using water (without an additive/fracture fluid system give you the % improvement that was measured (in the form of a % in reduced RPM). Comparing the same calculation result to other additive/frac fluids gives you a relevant measure of effectiveness.

The test procedure can be used to evaluate the results of using different size proppant or even proppant concentrations so as to make the evaluation specific to a particular treatment design.

If one could find a way to run the test at simulated downhole temperature conditions, one could obtain an even better evaluation of an additive/fracturing fluid contribution to proppant transport but this is difficult to do unless you can translate additive/fluid properties measured (using a viscometer at simulated temperature and shear) to similar fluid properties of a fluid at ambient conditions. Currently we lack the fluid properties that adequately describe the additives/frac fluid structure that appears to be the key to dynamic proppant transport.

Finally you can try to use the equipment to simulate transport conditions in the fracture by using rheology data (taken at simulated downhole conditions) and calculating a pumping fracture width. This width can be used to calculate shear conditions in the fracture during pumping. Knowing the shear conditions will allow you to calculate an RPM that results in the same shear conditions in the tests and therefore whether the additive/fluid being tested can keep proppant suspended at those conditions.

Suitable Components for Use in the Disclosure

Suitable blenders for use in this disclosure include, without limitation, blenders manufactured by Waring Products, Inc., Sunbeam Products, Inc., Hamilton Beach Brands, Inc., LA Vegan Shark blenders, SharkNinj a Operating LLC, Refersion Inc., Blendtec, Inc., Cuisinart Inc., or other similar blenders.

Suitable rpm sensor for use in this disclosure include, without limitation, rpm sensors manufactured by Honeywell, OROS, Digi-Key Electronics, ROHM Semiconductor USA, LLC, Datatraonics, Monarch Instruments, Allied Electronics, Inc., Sensor Developments, Inc., and other similar rpm sensors.

DETAILED DESCRIPTION OF METHODOLOGY OF THE DISCLOSURE

Dynamic Proppant Transport Test

Because proppant transport is a dynamic process, it is essential to develop a test procedure that is repeatable and realistically and accurately measures fluid transport properties under dynamic conditions. The proppant transport/suspension test should be capable of measuring proppant suspension/transport at shear rate conditions that are representative of what is experienced during the fracturing operations. It is also essential that the test procedure be capable of including a shear history representing conditions that the fracturing fluid experiences as it travels through the treating string on its way to the formation being fractured. With a test capable of achieving these two conditions, it will be possible to differentiate between the proppant transport properties of current slick water fracturing fluids and additives/systems designed to achieve additional proppant transport capabilities.

The inventor has found that a usable test approach for measuring dynamic proppant transport properties, the procedure should be capable of providing the following information: (1) measuring shear rates, (2) simulating high shear rate conditions experienced as the treating fluid trip to the formation to be treated, (3) simulating reduced shear rate experienced as the slurry moves out from the well bore into a created fracture geometry, (4) measuring shear rates reproducibly for realistic error calculations, and (5) providing a way to link the test results to the rheology properties of a fracturing fluid measured under downhole conditions.

The inventor has found that an apparatus may be constructed that includes a blender such as a Waring® blender, but any blender may be used, equipped with an rpm unit including an rpm sensor and a digital rpm readout.

DETAILED DESCRIPTION OF THE DRAWINGS OF THE DISCLOSURE

Figure 1A:
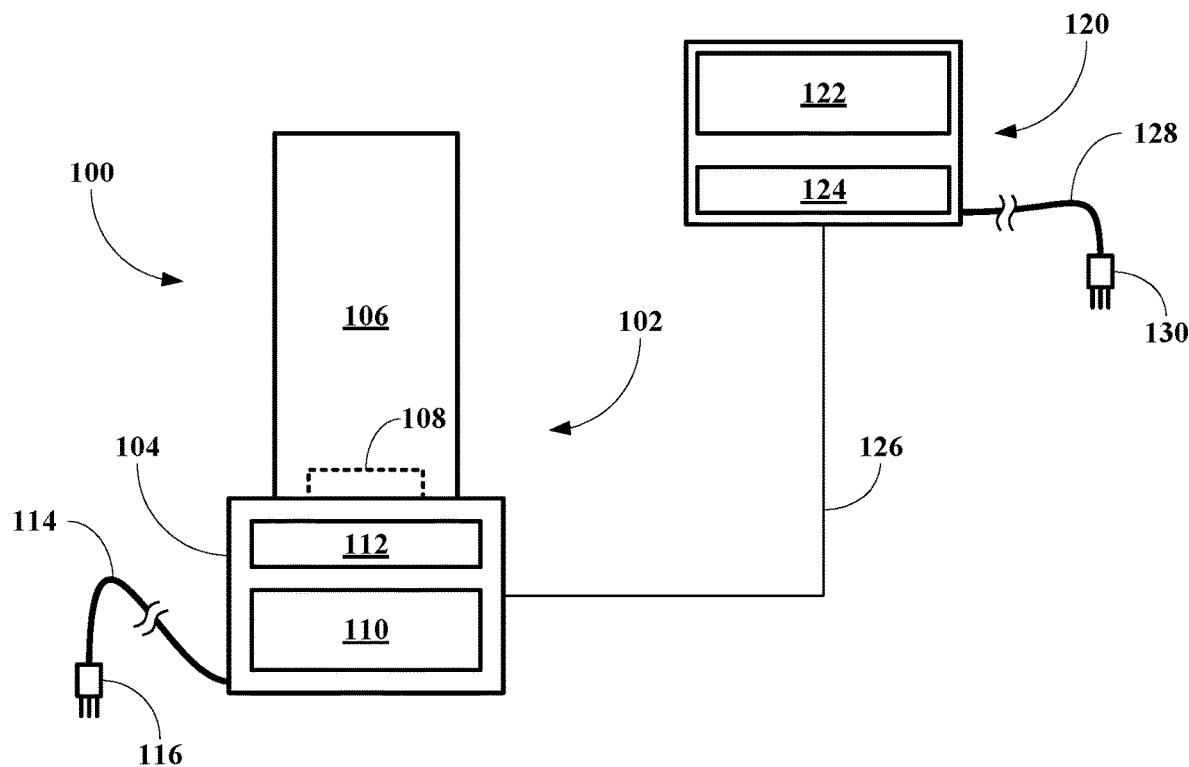
FIG. 1A depicts an embodiment of an apparatus of this disclosure.

Referring to FIG. 1A, an embodiment of an apparatus of this disclosure, generally 100, is shown to include a blender unit 102 and a rpm unit 120. The blender unit 102 includes a drive unit 104 and a blender jar 106 having a blade assembly 108. The drive unit 104 includes a control panel 110 and a display unit 112, where the control panel 108 includes control elements for turning the blender ON and OFF and for selecting blender speed settings and setting blender time, while the display unit 110 displays relevant blender speed settings, time setting, and elapsed time. The drive unit 104 also includes a power cord 114 having an outlet plug 116. The rpm unit 120 includes a control panel 122, a display unit 124, a cable 126 associated with a rpm sensor (now shown), a power cord 128 having an outlet plug 130, where the control panel 122 includes control elements for turning the rpm unit ON and OFF and optionally for controlling blender rpm and rpm time settings, while the display unit 124 displays relevant blender rpm values and optionally time and elapsed time.

Figure 1B:
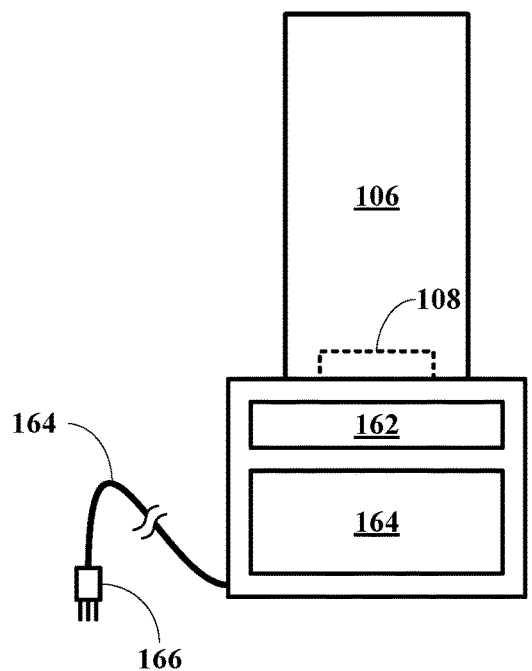
FIG. 1B depicts another embodiment of an apparatus of this disclosure.

Referring to FIG. 1B, another embodiment of an apparatus of this disclosure, generally 150, integrates the two components of FIGS. 1A and 1s shown to include a blender unit 152. The blender unit 152 includes a drive unit 154 and a blender jar 156 having a blade assembly 158. The drive unit 154 includes a control panel 160, a display unit 162, a rpm sensor (not shown), and a power cord 164 having an outlet plug 166, where the control panel 160 includes control elements for turning the blender ON and OFF and for controlling blender rpm settings, time setting, rpm time settings, and elapsed time, while the display unit 162 displays relevant blender speed settings, time settings, and elapsed time and relevant blender rpm values.

Figure 2:
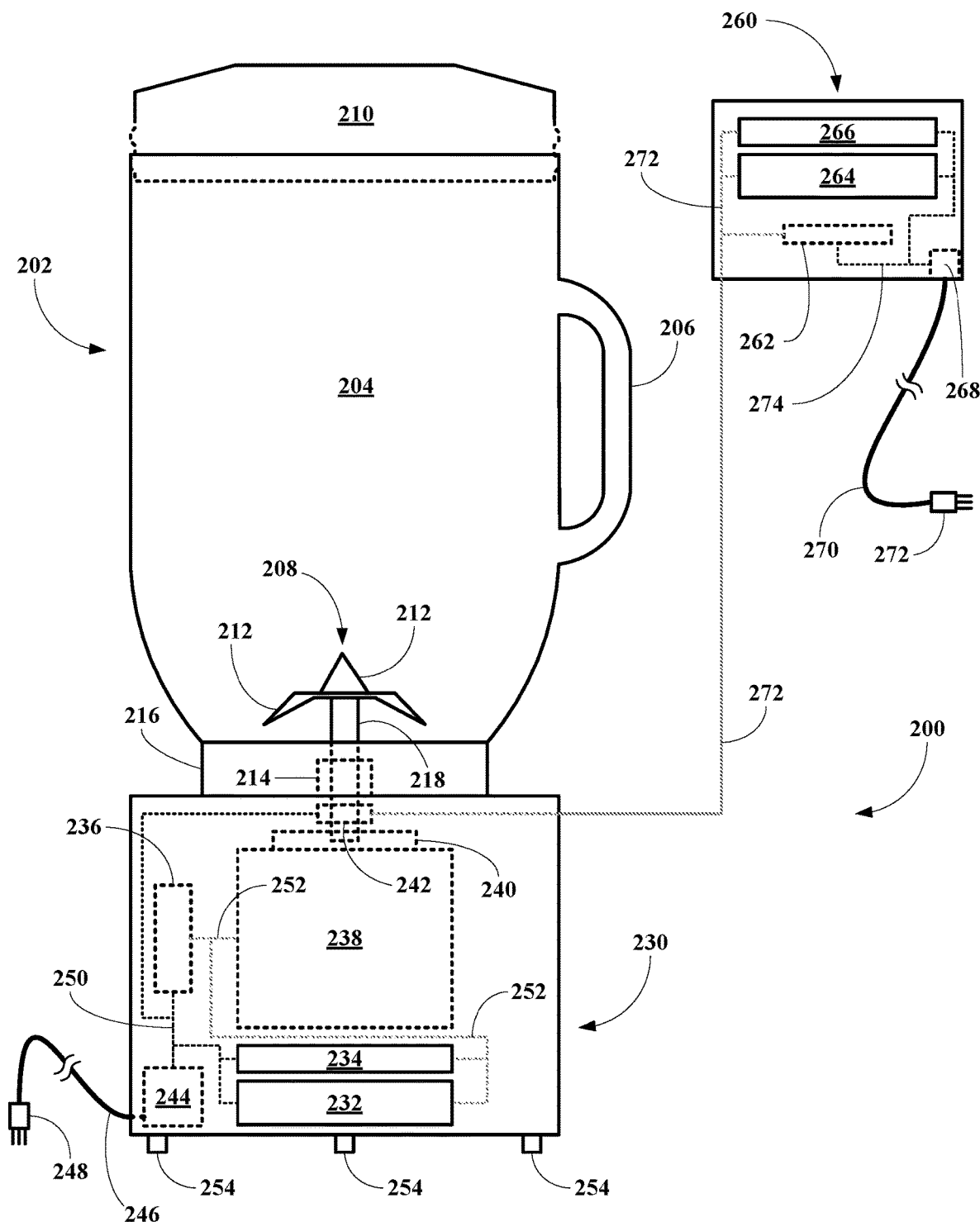
FIG. 2 depicts a detailed illustrative example of the apparatus of FIG. 1A.

Referring to FIG. 2, a specific embodiment of the apparatus of FIG. 1A, generally 200, is shown to include a blender unit 202 and a rpm unit 260. The blender unit 202 includes a blender jar unit 204 and a drive unit 230.

The blender jar unit 202 include a blender jar 204 having a handle 206, a blade assembly 208, and a lid 210. The blade assembly 208 includes blades 212 mounted on a mount 214 affixed to a bottom 216 of the jar 204. The blade assembly 208 also includes a shaft 218 for rotating the blades 212.

The drive unit 230 includes a control panel 232 and a display unit 234, where the control panel 232 includes control elements for turning the blender ON and OFF and for selecting blender speed settings and setting blender time, while the display unit 234 displays relevant blender speed settings, time setting, and elapsed time. The drive unit 230 also includes a processing unit or control unit 236, a motor 238, and a coupler 240 for receiving the shaft 218 and adapted to permit the motor 238 to rotate the shaft 218. The drive unit 230 also includes a rpm sensor 242, and a power supply 244 including a power cord 246 having an outlet plug 248. The power supply 244 supplies power to the control panel 232, the display unit 234, the processing unit 236, the motor 238, and the rpm sensor 242 via power conduits 250, and the processing unit 236 is connected to the control panel 232, the display unit 234, and the motor 238 via bi-directional communication conduits 252. The drive unit 230 also includes feet 254.

The rpm unit 260 includes a processing unit or control unit 262, a control panel 264, a display unit 266, and a power supply 268 including a power cord 270 having an outlet plug 272, where the control panel 264 includes control elements for turning the rpm unit ON and OFF and optionally for controlling blender rpm and rpm time settings, while the display unit 266 displays relevant blender rpm values and optionally time and elapsed time. The power supply 268 supplies power to the processing unit 262, the control panel 264, and the display unit 266 via power conduits 274. The processing unit 262 is connected to the control panel 232, the display unit 234, and the rpm sensor 242 via bi-directional communication conduits 276.

Figure 3:
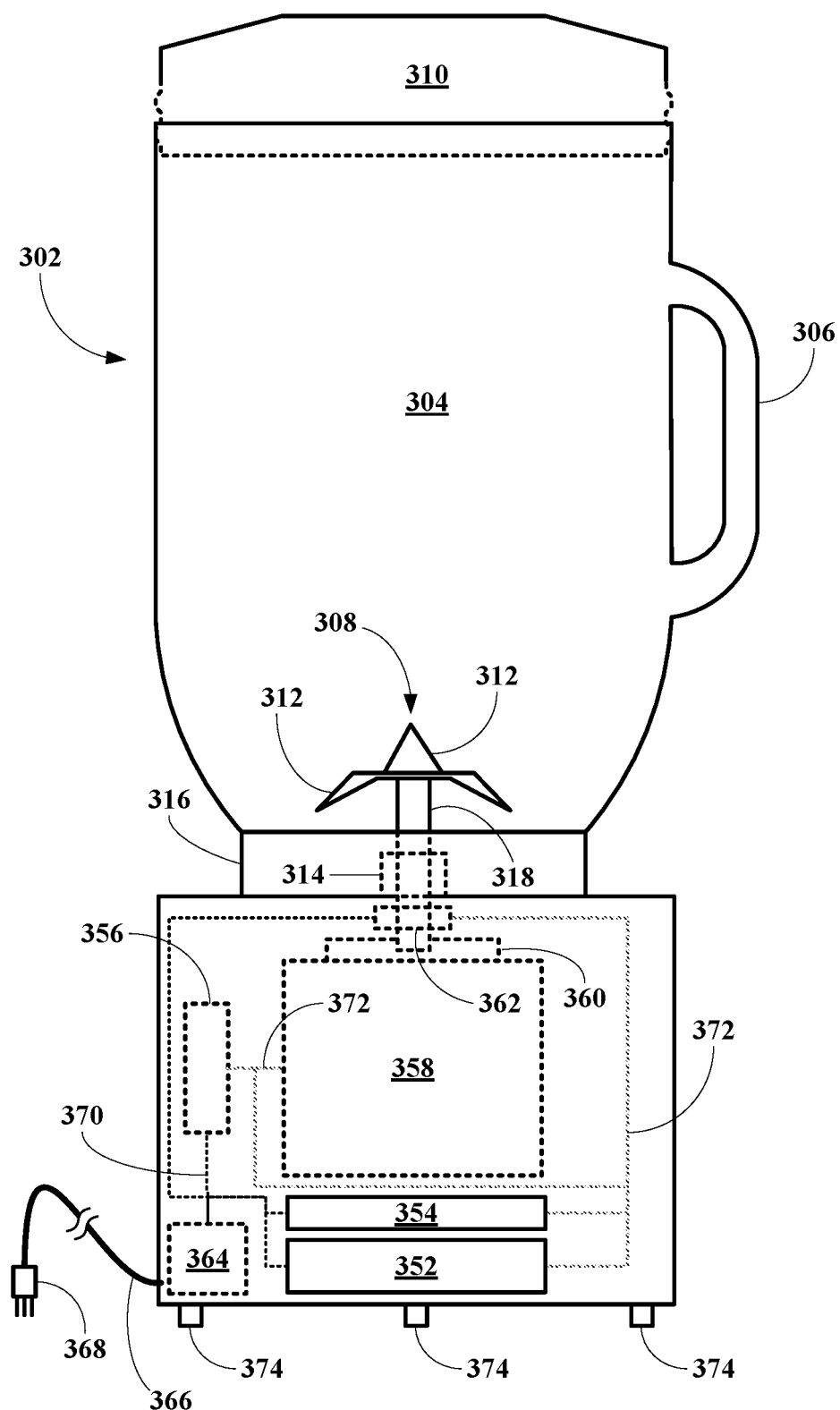
FIG. 3 depicts a detailed illustrative example of the apparatus of FIG. 1B.

Referring to FIG. 3, a specific embodiment of the apparatus of FIG. 1B, generally 300, is shown to include a blender unit 302 comprising a blender jar unit 304 and a drive unit 250.

The blender jar unit 302 include a blender jar 304 having a handle 306, a blade assembly 308, and a lid 310. The blade assembly 308 includes blades 312 mounted on a mount 314 affixed to a bottom 316 of the jar 304. The blade assembly 308 also includes a shaft 318 for rotating the blades 312.

The drive unit 350 includes a control panel 352 and a display unit 354, where the control panel 232 includes control elements for turning the blender ON and OFF and for selecting blender speed settings, blender time settings, and blender rpm settings, while the display unit 354 displays relevant blender speed settings, time setting, rpm values, and elapsed time. The drive unit 350 also includes a processing unit or control unit 356, a motor 358, and a coupler 360 for receiving the shaft 318 and adapted to permit the motor 358 to rotate the shaft 318. The drive unit 350 also includes a rpm sensor 362, and a power supply 364 including a power cord 366 having an outlet plug 368. The power supply 364 supplies power to the control panel 352, the display unit 354, the processing unit 356, the motor 358, and the rpm sensor 362 via power conduits 370, and the processing unit 356 is connected to the control panel 352, the display unit 354, the motor 358, and the rpm sensor 362 via bi-directional communication conduits 372. The drive unit 350 also includes feet 374.

Calculations of the Disclosure

Calculating Shear Rates from Blender Rpm Measurements

Using the dimensions of the blender jar and blade assembly combined with accurately measured rpm values during fluid blending, a shear rate at a given rpm may be calculated. A method for using measured blender rpm values to calculate shear rate values is now described.

Calculating an Effective Blender Jar Diameter

Because a typical blender jar has an irregular shape to improve blend efficiencies, an effective blender jar diameter is calculated. The effective cylindrical diameter is calculated by measuring a fluid height in the blender jar for a known volume of sample and then plugging that height and volume into a formula for calculating the volume of a cylinder according to Equation (1):

$$V = \pi r^2 h \quad (1)$$

where V is volume, r is the effective blender jar radius, and h is fluid height of a known volume of fluid. Thus, using a volume, V, of 500 mL or 30.5119 in³, r may be derived as follows:

$$30.5119 \text{ in}^3 = 3.1417 \times r^2 \text{ in}^2 \times 3.6875 \text{ in}$$

solving for $r^2$ gives:

$$r^2 = 30.5119/(3.1417)(3.6875)$$

$$r^2 = 2.6337 \text{ in}^2$$

solving for $r$ gives:

$$r = 1.6229 \text{ in}$$

Knowing the effective blender jar radius, r, the measured blender rpm values may be converted to shear rate values according to Equation (2):

$$ShearRate = \frac{2\pi r^b \times (rpm/60)}{r - r^b} s^{-1} \quad (2)$$

where r is the effective blender jar radius, $r^b$ is the mixer blade radius (which is directly measured), and rpm/60 is the rpm setting of the blender during each experimental run.

For a blender blade radius of 1.1811 in and a blender rpm value of 4500 rpm, Equation (2) gives a shear rate of:

$$ShearRate = \frac{2 \times 3.1417 \times 1.1811 \times (4500/60)}{1.6229 - 1.1811} = 1260 \text{ s}^{-1}$$

Next, the calculated shear rate may then be used to calculate a fluid velocity in a 5.5" casing pipe having an i.d. of 4.95" using Equation (3):

$$ShearRate = \frac{8 \times v}{d} \quad (3)$$

where v is the velocity of fluid in the pipe in ft/s and d is the radius of the pipe in ft. Rearranging the Equation (3), v is given as follows:

$$v = \frac{ShearRate \times d}{8}$$

Substituting the calculated shear rate of the fluid in the blender and the pipe diameter, then v may be calculated as:

$$v = \frac{1260 \text{ s}^{-1} \times (4.95/12)\text{ft}}{8} = 64.9 \text{ ft/s}$$

With a calculated fluid velocity v, a time for the high shear period $t_{hsp}$ may be given by Equation (4):

$$t_{hsp} = \frac{l_{ts}}{v} \quad (4)$$

where $t_{hsp}$ is the high shear period time, $l_{ts}$ is the length of treating string, and v is the calculated fluid velocity. Substituting $l_{ts}$ of 12,000 ft and v of is 64.9 ft/s as calculated as above, Equation (4) gives a high shear period, $t_{hsp}$ of:

$$t_{hsp} = \frac{12,000 \text{ ft}}{64.9 \text{ ft s}^{-1}} = 184.9 \text{ s}$$

where $t_{hsp}$ also equals 3 min. 4.9 s.

The fluid velocity v may be converted to barrels per minute down a specific o.d. casing $v_{bpm}$ using the following equation:

$$v = \frac{v_{bpm}}{cA} \quad (5)$$

where v is the fluid velocity, $v_{bpm}$ is the velocity expressed in bpm, and cA is the cross-sectional area of the pipe. Rearranging Equation (5), $v_{bpm}$ may be expressed as follows:

$$v_{bpm} = v \times cA$$

Substituting the values for v and cA and the appropriate conversion factors, $v_{bpm}$ is given by:

$$(64.9 \text{ ft/s} \div (5.61 \text{ ft}^3/\text{bar.xmin}/60\text{s})) \times (3.1417 \times 0.20625^2 \text{ ft}^2) = (64.9 \times 0.1336)/0.0935 \text{ bpm} = 92.8 \text{ bmp}$$

Many fracturing fluids and virtually all commonly used friction reducers have a certain level of shear degradation that occurs during the trip through a treating string to a formation, where fracturing is being initiated and extended. Due to this reality, rheology tests and in particular suspension/transport tests should include a representative high shear period in the test procedure. This high shear period provides the new testing procedure of this disclosure to be capable of delivering improved properties to the fracture fluid and fracturing design.

EXPERIMENTS OF THE DISCLOSURE

Using Equations (1-5), one may model the high shear history of a sample being tested in the blender apparatus of this invention to match any combination of pump rate, well depth, and pipe dimension. Once calculated, the parameters of the shear history represented by a combination of rpm and time, the actual suspension test may be run using the following test procedure:

1. Use a 250 mL sample size of a fracturing fluid including a friction reducer composition and/or polymer composition;
2. Hydrate[a] the fluid for 5 min. at 1500 rpm;

a The time allowed for polymer hydration may be representative of an expected hydration period (associated with the treatment) or some standard period.

3. Add 60 g of a proppant (equivalent to 2 ppg) to the fluid to form a slurry;
4. Mix[b] the slurry for 30 s at 1500 rpm;
5. Increase the blender rpm value to a high shear rpm value for a high shear period to mimic a calculated high shear history[b];

b It should be understood that the shear history may be specific to a particular application or some standard calculated shear history. A study did show that including sand (in the high shear history) did increase the shear degradation that was experienced by the sample being tested and therefore decreased dynamic suspension results.

6. At the conclusion of the high shear history, reduce the blender rpm to a proppant settling rpm, where a build-up of proppant on the bottom of the blend jar is visible;
7. Increase the blender rpm to fluidize the settled proppant and then decrease blender rpm to find a minimum rpm that just prevents proppant build-up;
8 Repeat step 7 to insure reproducibility; and
9. Record the lowest rpm reading—the rpm value that just prevent proppant build-up in the bottom of the blender jar.[c]

c It is also important to realize that for two test results to represent a significant difference, the change (in the measured RPM value) should be >5%.

To achieve a more complete evaluation of shear stability, a range of shear histories of increasing in severity were applied to each test fluid sample. The simulated shear histories are described as follows:

a. 3 min. @ 3400 rpm. This combination of rpm and time translates to a shear rate of 935 $s^{-1}$. If a treatment was being performed down a 5.5" o.d. casing, this combination of shear rate and time simulates a sample being pumped through approximately 8676' of casing at a rate of 68.9 bpm.

b. 5 min. @ 3400 rpm. This combination of rpm and time translates to a shear rate of 935 If a treatment was being performed down 5.5" o.d. casing, this combination of shear rate and time would simulate the sample being pumped through approximately 14,460' of casing at a rate of 68.9 bpm.

c. 3 min. @ 4500 rpm. This combination of rpm and time translates to a shear rate of 1260 $s^{-1}$. If a treatment was being performed down 5.5" o.d. casing, this combination of shear rate and time would simulate the sample being pumped through approximately 11,694 feet of casing at a rate of 92.9 bpm.

d. 5 min. @ 4500 rpm. This combination of rpm and time translates to a shear rate of 1260 $s^{-1}$. If a treatment was being performed down 5.5" o.d. casing, this combination of shear rate and time would simulate the sample being pumped through approximately 19,470' of casing at a rate of 92.9 bpm.

Using the aforementioned Dynamic Transport Test of this disclosure and the shear histories described above, one standard and three HiVis friction reducers were evaluated to establish their ability to contribute to dynamic proppant transport.

Dynamic Proppant Transport Testing of Four Fracturing Fluids

Utilizing the test procedure described in the previous section, four fracturing fluid including four different friction reducers or friction reducing compositions were evaluated to determine their ability to contribute to dynamic proppant transport after each had been subjected to four different representative shear histories. The four fracturing fluids comprised a base fluid (water) and one of the following friction reducing compositions:

| Additive | Description |
|---|---|
| SNF FLOJET ™ DR 22430[a] | Standard drag reduction additive |
| KEMFLOW ™ A-4251[b] | HiVis drag reduction additive |
| FLOPAM ™ EMF-533[c] | HiVis drag reduction additive |
| PfP AFRE-4[d] | HiVis drag reduction additive |

[a] friction reducing composition available from SNF Group,
[b] friction reducing composition available from Kemira Oyj,
[c] friction reducing composition available from SNF Group, and
[d] friction reducing composition available from PfP Industries.

Each of fracturing fluids were evaluated in the following manner:

1. three different concentrations: 1 gpt, 2 gpt, and 3 gpt.
2. shear histories a-d
3. base fluid used was fresh water
4. proppant used was 30/50 mesh sand
5. controls were run using water and 30/50 mesh sand with no additive
6. If an additive test result was within 5% of the control value, the test was discontinued Table I tabulates the testing data of the 4 different fracturing fluids tested at the three different levels: 1 gpt, 2 gpt, and 3 gpt.

TABLE I

Blender Test Data for 4 Different Fracturing Fluids and Three Different Levels

| Fluid | Amount (gpt) | Pump Rate (bpm)/ Shear Rate ($s^{-1}$) | Well Depth[1] (ft) | Min RPM[2] (rpm) | % R v. B |
|---|---|---|---|---|---|
| Base | | | | 994 | |
| 1 gpt Tests | | | | | |
| DR 22430 | 1 | 68.9/935 | 8676 | 992 | 0 |
| DR 22430 | 1 | 68.9/935 | 14,460 | NA[3] | |
| DR 22430 | 1 | 92.9/1260 | 11,694 | NA | |
| DR 22430 | 1 | 92.9/1260 | 19,470 | NA | |
| A-4251 | 1 | 68.9/935 | 8676 | 1001 | 0 |
| A-4251 | 1 | 68.9/935 | 14,460 | NA | |
| A-4251 | 1 | 92.9/1260 | 11,694 | NA | |
| A-4251 | 1 | 92.9/1260 | 19,470 | NA | |
| EMF-533 | 1 | 68.9/935 | 8676 | 998 | 0 |
| EMF-533 | 1 | 68.9/935 | 14,460 | NA | |
| EMF-533 | 1 | 92.9/1260 | 11,694 | NA | |
| EMF-533 | 1 | 92.9/1260 | 19,470 | NA | |
| AFRE-4 | 1 | 68.9/935 | 8676 | 749 | 24.6 |
| AFRE-4 | 1 | 68.9/935 | 14,460 | 790 | 20.5 |
| AFRE-4 | 1 | 92.9/1260 | 11,694 | 938 | 5.6 |
| AFRE-4 | 1 | 92.9/1260 | 19,470 | 923 | 7.1 |
| 2 gpt Tests | | | | | |

TABLE I-continued

Blender Test Data for 4 Different
Fracturing Fluids and Three Different Levels

| Fluid | Amount (gpt) | Pump Rate (bpm)/ Shear Rate (s$^{-1}$) | Well Depth[1] (ft) | Min RPM[2] (rpm) | % R v. B |
|---|---|---|---|---|---|
| DR 22430 | 2 | 68.9/935 | 8676 | 803 | 19.2 |
| DR 22430 | 2 | 68.9/935 | 14,460 | 889 | 10.6 |
| DR 22430 | 2 | 92.9/1260 | 11,694 | 992 | 0 |
| DR 22430 | 2 | 92.9/1260 | 19,470 | NA | |
| A-4251 | 2 | 68.9/935 | 8676 | 814 | 18.1 |
| A-4251 | 2 | 68.9/935 | 14,460 | 901 | 9.4 |
| A-4251 | 2 | 92.9/1260 | 11,694 | 1003 | 0 |
| A-4251 | 2 | 92.9/1260 | 19,470 | NA | |
| EMF-533 | 2 | 68.9/935 | 8676 | 709 | 28.7 |
| EMF-533 | 2 | 68.9/935 | 14,460 | 800 | 19.5 |
| EMF-533 | 2 | 92.9/1260 | 11,694 | 883 | 11.2 |
| EMF-533 | 2 | 92.9/1260 | 19,470 | 941 | 5.3 |
| AFRE-4 | 2 | 68.9/935 | 8676 | 803 | 19.2 |
| AFRE-4 | 2 | 68.9/935 | 14,460 | 716 | 28.0 |
| AFRE-4 | 2 | 92.9/1260 | 11,694 | 734 | 26.2 |
| AFRE-4 | 2 | 92.9/1260 | 19,470 | 783 | 21.2 |
| 3 gpt Tests | | | | | |
| DR 22430 | 3 | 68.9/935 | 8676 | 682 | 31.4 |
| DR 22430 | 3 | 68.9/935 | 14,460 | 729 | 26.7 |
| DR 22430 | 3 | 92.9/1260 | 11,694 | 768 | 22.7 |
| DR 22430 | 3 | 92.9/1260 | 19,470 | 886 | 10.9 |
| A-4251 | 3 | 68.9/935 | 8676 | 724 | 27.2 |
| A-4251 | 3 | 68.9/935 | 14,460 | 755 | 24.0 |
| A-4251 | 3 | 92.9/1260 | 11,694 | 778 | 21.7 |
| A-4251 | 3 | 92.9/1260 | 19,470 | 968 | 2.6 |
| EMF-533 | 3 | 68.9/935 | 8676 | 664 | 33.2 |
| EMF-533 | 3 | 68.9/935 | 14,460 | 725 | 27.1 |
| EMF-533 | 3 | 92.9/1260 | 11,694 | 752 | 24.3 |
| EMF-533 | 3 | 92.9/1260 | 19,470 | 768 | 22.7 |
| AFRE-4 | 3 | 68.9/935 | 8676 | 503 | 49.4 |
| AFRE-4 | 3 | 68.9/935 | 14,460 | 694 | 30.2 |
| AFRE-4 | 3 | 92.9/1260 | 11,694 | 753 | 24.2 |
| AFRE-4 | 3 | 92.9/1260 | 19,470 | 802 | 19.3 |

[1]At any given pump rate/shear rate combination, the well depth equates to how long the sample was sheared. The shorter distance (pump rate/shear rate combination) equates to the shear rate being applied to the sample for 3 minutes. The longer distance/depth equates to the sample seeing a 5 minute shear history. The well depth entry was calculated from the pump rate (converted into fluid velocity) times the duration of the shear period (either 3 or 5 minutes).
[2]When comparing to minimum RPM readings, the RPM values must vary by >5% for the difference to be considered significant (outside the error bar).
[3]Once the minimum RPM reading approached the base case (994 for water without a polymer), the sample was no longer tested at increasing shear rates or times. In such cases, the term "NA" was used to fill out the table.

Summary of Results

Examination of the results presented above leads to certain conclusions. At a concentration of 1 gpt, only the fracturing fluid including the additive AFRE-4 has sufficient resistance to shear degradation to be able to contribute a measurable amount to proppant transport in the fracture after experiencing a shear history approaching what is currently encountered in slick water fracturing operations (traveling through 14,460' of 5.5" o.d. casing at a rate of 68.9 bpm).

If used at a concentration of 1 gpt, the fracturing fluids including the additives DR-22430, EMF-533 and A-4152 are incapable of contributing to proppant transport in the fracture if first subjected to a shear history equivalent to being pumped through 8676' of 5.5" o.d. casing at a rate of 68.9 bpm. This shear history is well below what is experienced in most current slick water fracturing designs.

At a concentration of 2 gpt, the fracturing fluids including the additives DR 22430 and A-4251 are incapable of contributing to proppant transport in the fracture if first subjected to the minimum shear history utilized in this analysis (68.9 bpm through 8676' of 5.5" o.d. casing).

At a concentration of 2 gpt, the fracturing fluids including the additives AFRE-4 and EMF-533 are sufficiently resistance to shear degradation to be able to contribute a similar level to proppant transport after experiencing a shear history that represents 68.9 bpm through 14,460' of 5.5" o.d. casing. However, when the shear is increased to simulate 92.9 bpm through 19,470' of 5.5" o.d. casing, the fracturing fluids including the additive EMF-533 essentially shears out losing its ability to contribute to proppant transport, while the fracturing fluids including the additive AFRE-4 was relatively unaffected by the increased shear history.

At a concentration of 3 gpt, the fracturing fluids including the additives DR 22430 and A-4251 are capable of contributing to proppant transport until they are subjected to shear rate history of 92.9 bpm through 19,470' of 5.5" o.d. at which time they both degrade to the point that there is minimal ability to contribute to proppant transport.

At a concentration of 3 gpt, the fracturing fluids including the additive AFRE-4 significantly out-performed the fracturing fluids including the additive EMF-533 at the shear history equivalent to 68.9 bpm through 8676' of 5.5" o.d. casing. With all the other shear histories (time and shear rate combinations) that were simulated, the two additives performed at a similar level.

Taking the Dynamic Proppant Transport Test to the Next Level

As presented in the previous section, the dynamic proppant test procedure of this disclosure and data collected show that the procedure is an effectively way to evaluate drag reduction additives and to determine their resistant to shear degradation encountered as a fracturing fluid travels from the surface into the formation to be fractured. This is a critical property to measure and understand because while poor resistance to shear degradation may not translate to poor performance in minimizing friction pressure, it may decrease or eliminate the ability for additives to improve proppant transport that is required to insure that, during the fracturing process, proppant has been carried the maximum distance into the created fractures.

Ideally the new approach should be able to measure dynamic proppant transport and provide some insights into the ability of an additive composition or fracturing fluid system to contribute to proppant transport at simulated downhole conditions. The current equipment configuration of the dynamic proppant transport test of this disclosure does not readily lend itself to being run at elevated temperatures. To improve the overall value of the data generated by the dynamic transport protocol there needs to be a way to correlate test results to fracturing fluid properties and fracturing fluid rheology properties that can be measured as a function of time and temperature.

For many years the industry has evaluated fracturing fluid systems/additives through the measurement of sample viscosity and rheological properties such as n' under conditions of time and elevated temperature. One example of the equipment used to generate this type of data is a Grace M5600 HPHT Rheometer. Using this equipment, it is possible to generate rheological properties along with viscosity for any purposed fracturing fluid at conditions representative of what may be expected in the fracture. Instruments like the Grace M5600 HPHT Rheometer have another capability that adds realism/additional value to the test results. Properly outfitted, this type rheometer may be programmed to include a representative shear history up to 1870 s$^{-1}$ prior to the generating the data as shown and described below.

The dynamic transport test results set forth above confirmed the importance of including a shear history in any evaluation. Therefore, the first step in building a link between dynamic proppant transport test results and fracturing fluid rheological properties measured at simulated downhole conditions is to include a similar shear history into the rheometer testing sequence Taking this step immediately raises an obvious question. Does the shear history created in a blender apparatus of this disclosure effect the fracturing fluid sample to the same degree as a shear history producing a similar shear rate created by a rheometer? To address this question n' and viscosity data from three rheology tests, each using a 3 gpt AFRE-4 fracturing fluid, were compared. The tests are described as follows:

Test 1—no simulated shear history test of a fracturing fluid including 3 gpt of an additive evaluated at 140° F.;

Test 2—a shear history of 3 min. at a 4500 rpm blender setting equating to a shear rate of 1260 $s^{-1}$ test of a fracturing fluid including 3 gpt of an additive evaluated 140° F.;

Test 2'—a shear history of 3 min at a 4500 rpm blender setting equating to a shear rate of 1260 $s^{-1}$ test of a fracturing fluid including 3 gpt of an additive evaluated at room temperature.

Test 3—a shear history of 3 min. at a shear rate of 1260 $s^{-1}$ generated on the Grace Rheometer test of a fracturing fluid including 3 gpt of an additive evaluated 140° F.

The tests were run at 140° F. because that is the expected fluid temperature reached an hour into the pumping process during fracturing of a well that has a bottom hole temperature (BHT) between about 175° F. and 185° F. The results of the three tests, Test 1, Test 2, and Test 3 are shown in Table II below.

TABLE II

Comparison of Blender Shear Data and Rheometer Shear Data of a 3 gpt AFRE-4 Fluid

| Test | n' | | | η @ 100 $s^{-1}$ (cP) | | |
|---|---|---|---|---|---|---|
| Description | 6 min. | 30 min. | 60 min. | 6 min. | 30 min. | 60 min. |
| Test 1 | 0.403 | 0.359 | 0.381 | 31 | 22 | 21 |
| Test 2 | 0.356 | 0.379 | 0.399 | 23 | 19 | 19 |
| Test 3 | 0.451 | 0.431 | 0.449 | 26 | 18 | 18 |

Using the same approach, a fracturing fluids including the additives EMF 533 gave the results tabulated in Table III below.

TABLE III

Comparison of Blender Shear Data and Rheometer Shear Data of a 3 gpt EMF 533 Fluid

| Test | n' | | | η @ 100 $s^{-1}$ (cP) | | |
|---|---|---|---|---|---|---|
| Description | 6 min. | 30 min. | 60 min. | 6 min. | 30 min. | 60 min. |
| Test 1 | 0.553 | 0.327 | 0.336 | 18 | 19 | 18 |
| Test 2 | 0.387 | 0.523 | 0.573 | 17 | 14 | 13 |

In the case of the fracturing fluids including the additives AFRE-4, although the test results did show a measurable degree of shear degradation between the "no shear" case and either test performed with a shear history, there was virtually no difference in results when examining the data from the two methods used to generate the high shear history, e.g., 1 cP difference in it η (viscosity) and 0.05 difference in n'.

In the case of the fracturing fluids including the additives EMF 533, the combination of a representative high shear history and elevated temperature did have a significant impact on it η and n' measured values. The data showed that it η decreased approximately 28%, while n' increased over 40%.

Having proven that the shear history from the dynamic transport test of this disclosure appears to have a similar affect on the rheological properties of the friction reducer additive being evaluated as a shear history created by the Grace rheometer, now the focus will be establishing a link between the dynamic transport test performed at room temperature and the rheological properties of a friction reduction additive evaluated at down-hole conditions. Thus, the approach may be summarized as follows:

1. Pick a realistic shear history such as this case 3-5 min. at a shear rate of 1260 $s^{-1}$
2. Run a rheology test that includes a high shear history and reaches a maximum fluid temperature of 140° F. to generate η and n' data for a period of one hour.
3. Select an additive and concentration that you want to run to generate the data that results from a test that includes items 1 and 2.

Having developed the data identified in item 3, additive concentration will be varied with the goal being to make a room temperature run that uses a lower concentration of the same friction reducer and that will result in a similar one hour viscosity (η) of 100 $s^{-1}$ and n' as was measured in the rheology test run at 140° F. Using this approach, several room temperature formulations were run to find a match for the rheology results obtained when testing a 3 gpt AFRE-4 fracturing fluid evaluated at 140° F. and a 3 gpt EMF-533 fracturing fluid evaluated at 140° F. Shown below are a comparison of the 3 gpt AFRE-4 fracturing fluid and the 3 gpt EMF-533 fracturing fluid evaluated at 140° F. and the two fracturing fluids evaluated at room temperature.

The results for a 3 gpt AFRE-4 fracturing fluid evaluated at 140° F. are shown in Table IV below.

TABLE IV

Blender Shear Data of a 3 gpt AFRE-4 Fracturing Fluid at 140° F.

| Test | n' | | | η @ 100 $s^{-1}$ (cP) | | |
|---|---|---|---|---|---|---|
| Description | 6 min. | 30 min. | 60 min. | 6 min. | 30 min. | 60 min. |
| Test 2 | 0.356 | 0.379 | 0.399 | 23 | 19 | 19 |

The results for a 2.5 t AFRE-4 fracturing fluid evaluated at room temperature are shown in Table V below.

TABLE V

Blender Shear Data of a 2.5 gpt AFRE-4 Fracturing Fluid at Room Temperature

| Test | n' | | | η @ 100 $s^{-1}$ (cP) | | |
|---|---|---|---|---|---|---|
| Description | 6 min | 30 min | 60 min | 6 min | 30 min | 60 min |
| Test 2' | 0.337 | 0.468 | 0.504 | 17 | 19 | 18 |

The results of a 3 t EMF-533 fracturing fluid evaluated at 140° F. are shown in Table VI below.

TABLE VI

Blender Shear Data of a 3 gpt Fracturing
Fluid EMF-533 at 140° F.

| Test | n' | | | η @ 100 s$^{-1}$ (cP) | | |
|---|---|---|---|---|---|---|
| Description | 6 min | 30 min | 60 min | 6 min | 30 min | 60 min |
| Test 2 | 0.387 | 0.523 | 0.573 | 17 | 14 | 13 |

The results of a 2.5 t EMF-533 fracturing fluid evaluated at room temperature are shown in Table VII below.

TABLE VII

Blender Shear Data of a 2.5 gpt Fracturing
Fluid EMF-533 at Room Temperature

| Test | n' | | | η @ 100 s$^{-1}$ (cP) | | |
|---|---|---|---|---|---|---|
| Description | 6 min | 30 min | 60 min | 6 min | 30 min | 60 min |
| Test 2' | 0.365 | 0.575 | 0.633 | 11 | 13 | 12 |

In the dynamic transport test results shown above, a 3 gpt AFRE-4 fracturing fluid and a 3 gpt EMF-533 fracturing fluid gave similar results except when subjected to a shear history of 3 min. at a shear rate of 935 At this shear history the AFRE-4 fracturing fluid performed measurably better than the EMF-533 fracturing fluid.

However, these test results are really only a measure ability of each of the additives to resist shear degradation. By testing the AFRE-4 fracturing fluid and the EMF-533 fracturing fluid at room temperature that mirror the rheological properties of the two additives at elevated temperatures, dynamic suspension tests may be performed that combine the effects of shear and thermal degradation into a room temperature test. For different friction reducing (FR) compositions, a test protocol has been developed as follows:

1. Hydrate a 250 mL sample of a FR composition in fresh water at a concentration found to mirror a 3 gpt additive concentration at room temperature in the blender apparatus for 30 min. at 1500 rpm;
2. Add 60 g of 30/50 sand, equivalent to a 2 ppg proppant concentration;
3. Mix the slurry at 4500 rpm (equivalent to 1260 s$^{-1}$) for 3 or 5 minutes;
4. Drop the mixer speed to 1000 rpm (equivalent to 280 s$^{-1}$) and hold for one hour;
5. At the conclusion of the one hour period, reduce the blender rpm until build-up of proppant on the bottom of blend jar is visible;
6. Increase blender rpm to fluidize the settled proppant and then start decreasing the blender rpm to determine a minimum rpm that prevents proppant build-up.
7. Repeat this process to insure that a reproducible result has been obtained; and
8. Record the minimum rpm value.

The 1000 rpm one hour step 4 represents an rpm value that maintains proppant suspension even if the FR composition has no ability to contribute to proppant transport.

Utilizing this approach the two FR compositions were compared using shear histories of 3 and 5 min. at a shear rate to 1260 s$^{-1}$. The results of this comparison are shown in Table VIII below.

TABLE VIII

Blender Shear Data of a 2.5 gpt
Fracturing Fluid EMF-533 at Room Temperature

| Additive | Pump Rate (bpm)/Shear Rate (s$^{-1}$) | Well Depth[2] (ft) | Min RPM[3] (rpm) | Reduction (%) |
|---|---|---|---|---|
| Base Fluid | | | 994 | |
| Simulated[1] 3 gpt | 92.9/1260 | 11,694 | 701 | 29.5 |
| EMF 533 Fluid | 92.9/1260 | 19,470 | 728 | 26.8 |
| Simulated[1] 3 gpt | 92.9/1260 | 11,694 | 677 | 31.9 |
| AFRE-4 Fluid | 92.9/1260 | 19,470 | 699 | 29.7 |

[1]The concentration of the additive that creates a similar one hour η and n' as a rheology test run on 3 gpt of the additive subjected to the designated shear rate and 140° F..
[2]Well depth correlates to fluid velocity (64.9 ft/s as described above) multiplied by either the 3 or 5 minute time used in the shear history.
[3]When comparing two minimum rpm readings, a difference of 5% is required for the difference to be considered significant (outside the error bar).

The results of the adjusted room temperature versions of the AFRE-4 fracturing fluid and the EMF 533 fracturing fluid were found to be very similar with a slight but not significant advantage in performance going to the AFRE-4 fracturing fluid. Considering the difference in viscosity (η) at fracture conditions is 6 cps corresponding to a 32% reduction, one would think that would translate to more of an advantage in dynamic proppant transport results, but that was not the case. What could contribute to this result? It is possible the dynamic proppant transport test results are more a function of structure than viscosity. HiVis FR compositions are high molecular weight, branched polymers which as long as their structure can survive the high shear conditions experienced during the trip through tubular goods may be capable of significantly contributing to proppant transport in fractures.

So given the results from the dynamic transport tests, if one were trying to design a treatment using a HiVis FR composition and needed to choose between the EMF 533 fracturing fluid and the AFRE-4 fracturing fluid, what else should be considered? There are two additional areas of performance that can be used to differentiate between HiVis FR compositions:

Drag Reduction—how effective is the FR composition in minimizing friction pressure Contribution to pumping generated fracture width—the ability for the FR composition to maintain viscosity after being subjected to a shear history and an elevated temperature Drag reduction is a critical property that for some time has been measured in a flow loop that is capable of generating similar fluid velocities to what is encountered in the tubular fracturing fluid string. At high volume rates utilized in today's slick water designs, a few percent difference in the level of drag reduction that the HiVis FR composition affords translates into 100's of psi difference in surface treating pressure.

The contribution of a FR composition to the generation of pumping fracture width is directly tied to the viscosity of the fracturing fluid measured at downhole conditions at an elevated temperature and after being subjected to a representative shear history. This property was documented for two HiVi FR compositions, EMF 533 and the AFRE-4, used in the dynamic proppant transport test that were performed after simulating the rheology at downhole conditions. As indicated previously, evaluating HiVi FR compositions at an hour, which approximates 30 minutes after reaching an expected BHT of 140° F., revealed that a 3 gpt AFRE-4 fracturing fluid had a viscosity of 19 cPs. This represented a 6 cPs or a 40% advantage over the EMF 533 fracturing fluid. While the difference did not translate to a significant advantage in dynamic proppant transport, the difference is sufficient to theoretically contribute to a substantially wider fracture. The fracture width may be calculated using Equation (6):

$$Wm = 0.3[Q\eta(1-n)l/G]1/4 \quad (6)$$

where Wm is the maximum fracture width at the wellbore, Q is the pump rate, η is the viscosity of the fluid, n is the Poisson ratio, l is the fracture length (one wing), and G is the shear modulus, which is a function of the Young modulus and the Poisson ratio.

Holding all the variables constant (except h) means the difference in the fracture width Wm, when comparing the viscosity η of the AFRE-4 fracturing fluid to the EMF 533 fracturing fluid, boils down to a ratio of viscosities (19 to 13) taken to the ¼ power. The difference calculates out to ±10% in width. Another way to express the difference in the viscosity advantage provided by the AFRE-4 fracturing fluid is that theoretically this fluid should reduce the injection rate by ±10% as compared the to EMF 533 fracturing fluid in the treatment design without impacting the created maximum fracture width at the wellbore.

The inventor has demonstrated a new method for evaluating dynamic proppant transport of fracturing fluids and the new approach may be used to differentiate between various friction reduction compositions. The method includes (1) evaluating resistance to shear degradation of a fracturing fluid additive, and (2) linking the rheology properties of the fracturing fluid measured at downhole conditions to dynamic transport test performed at room temperature on a version of the fracturing fluid that mirrors properties (η and n') documented in the rheology test.

Utilizing the testing method of this disclosure, four different friction reduction additives, a standard FR composition and three HiVi FR compositions, were evaluated. The new method demonstrated that the standard FR composition, DR 22430, did not resist representative shear histories an additive concentrations of 1 gpt and 2 gpt. At 3 gpt, the DR 22430 FR composition was still measurably less effective in contributing to proppant transport compared to two of the three HiVis additives, AFRE-4 and EMF 533.

The new method also demonstrated that the HiVis FR composition A-4251 was incapable of resisting shear degradation at concentrations of 1 gpt and 2 gpt, while at 3 gpt, the A-4251 HiVis FR composition was not measurably superior to the standard DR 22430 FR composition and was significantly inferior to the AFRE-4 HiVis FR composition and the EMF 533 HiVis FR composition.

At concentrations of 1 gpt and 2 gpt the AFRE-4 fracturing fluid showed a better resistance to shear degradation than did the EMF 533 fracturing fluid and this advantage translated to an improved proppant transport capability. However when dynamic transport tests were performed at 3 gpt (utilizing formulations that mirrored the rheological properties of the two HiVis additives at downhole conditions) both additives performed similarly.

In the absence of drag reduction data, the property that can be utilized to differentiate between the AFRE-4 fracturing fluid and the EMF 533 fracturing fluid is the additive theoretical impact on fracture width generation. In fracture width calculation, the AFRE-4 fracturing fluid advantage in viscosity (measured at expected downhole conditions) may translate into a ±10% increase in viscosity.

It should be recognized that the methods the include a high shear period that includes the proppant in the slurry when going through the high shear rate appears to contribute to an increased shear degradation effect on the sample being tested. Then, the second method, the concept of trying to incorporate a representation of the sample's rheological properties measured at simulated fracture conditions so that dynamic transport tests can be used as a contributing factor to developing a better treatment design by taking proppant transport into consideration. The development of a room temperature version of the methodology by using viscosity and rheologic al parameters such as n' and K' permits connecting downhole fluid properties to a room temperature test of dynamic transport capacity of fracturing fluids. However, viscosity and/or n' and K' do not appear to relate directly to dynamic proppant transport capacity of fracturing fluids. The inventor believes that polymer structure, which is not well represented by viscosity and/or n' and K', may represent a greater factor in modeling dynamic proppant transport capacity of fracturing fluids. The inventor believe that there are properties that may be tied more closely to structures within the fracturing fluid formed by the additives such as G' and G" and by incorporating these values into the methodology may produce even better results.

Dynamic Transport Proppant Suspension Testing

The present example illustrates the use the dynamic transport test apparatuses and methods of this disclosure to evaluate the ability of an additive to aid in proppant suspension as the fracturing fluid slurry moves through surface pumping equipment.

To evaluate the ability of an additive to aid in transporting sand/proppant through surface equipment the dynamic transport test must incorporate a very short hydration period to simulate the short time the polymer spends in the blender unit that feeds the high pressure pumps. Residence time in the blender unit is generally on the order of ±10 seconds. For a polymer to aid in proppant transport through the surface equipment, it much generate a significant viscosity or structure rapidly so that it may aid in proppant transport from the blender unit, through the high pressure pumps, and into the wellhead.

To evaluate this property, two combinations of friction reducer and hydration methods were simulated. Two liquid emulsion friction reducers (1) a standard friction reducer STD FR and (2) a high viscosity friction reducer FR1 along with a dry form of a high viscosity friction reducer FR1 were evaluated. The dry FR1 was hydrated using a mixing unit known to accelerate the hydration of polymer in an aqueous solution. The hydration unit designed to minimize hydration time is produced by PfP Industries LLC and is known by the designation FR-EZ Unit.

For a friction reducer to assist in proppant transport through surface equipment, it has to hydrate fast because it is in the blender for a very short time period (while sand is added) before going to the high pressure pumps. Below the hydration rates of a dry FR1 sent through a FR-EZ unit is compared to the standard slurry polymer STD FR. We also tested a competitive high viscosity friction reducer HVFR.

| Sample | Hydration equipment | Viscosity (in cps) | | | | |
|---|---|---|---|---|---|---|
| | | 30 s | 1 min. | 2 min. | 3 min. | 5 min. |
| #1 | FR-EZ unit @ 123 gpm | 12.9 | 17.1 | 28.5 | 33.0 | 33.5 |
| #2 | Lab Mixer @ 1250 RPM | 5.2 | 8.0 | 14.8 | 21.3 | 24.1 |

To simulate the period in the blender and traveling through surface equipment the dynamic proppant transport test was altered in the following manner:

1. Using a 250 ml sample size start mixing the fluid sample at 1200 RPM. At 1200 RPM the base fluid can keep any size sand (equal to or smaller than 20/40) suspended.
2. Add 60 gm of the proppant to be tested (equivalent to 2 ppg).
3. Add the FR to be tests and mix for 10 seconds (simulates maximum time in the blender).
4. At the end of Step #3, reduce the blender RPM to 740[1] and watch for sand build-up (on the bottom of blend jar) is visible. 740 RPM is a rate that will not keep sand in suspension if the friction reducer being tested is not contributing in a significant way to the suspension of the sand/proppant.

Using the procedure described on the previous slide, four tests will be run and their results compared. The four tests included (1) 1 gpt of the STD FR; (2) 1 gpt liquid of a competitive high viscosity friction reducer HVFR; (3) 4 ppt FR1 hydrated in FR-EZ unit; and (4) 2 ppt FR1 hydrated in FR-EZ unit.

The results of this test sequence are shown in a set of photographs in FIGS. 4A-D. Looking at FIG. 4A, a photograph of sand settling of a test solution including 1 gpt STD FR, which showed that the STD FR was in capable of maintaining the sand in suspension when the mixing RPM was reduced. Looking at FIG. 4B, a photograph of sand settling of a test solution including 1 gpt liquid HVFR, which showed that the HVFR was in capable of maintaining the sand in suspension when the mixing RPM was reduced. Looking at FIG. 4C, a photograph of sand settling of a test solution including 4 ppt FR1, which showed the FR1 was capable of maintaining the sand in suspension when the mixing RPM was reduced. Looking at FIG. 4D, a photograph of sand settling of a test solution including 2 ppt FR1, which showed the FR1 was capable of maintaining the sand in suspension when the mixing RPM was reduced even at one half the original amount.

The liquid polymer samples showed insufficient time to hydrate in the 10 second mix period to contribute to dynamic proppant suspension to the extent that when the RPM was reduced the sand sample was not kept suspended. The dry polymer samples of FR1 hydrated with the FR-EZ unit showed the ability to keep the proppant suspended once the RPM was dropped even when the high viscosity friction reducer was tested at a reduced concentration.

CLOSING PARAGRAPH OF THE DISCLOSURE

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

I claim:

1. A method comprising:
  hydrating a sample of a fracturing fluid at room temperature at a hydrating rpm value for a hydrating period in a blender apparatus comprising:
    a blender unit including:
      a base unit having:
        a motor;
      a jar unit including:
        a jar;
        a base; and
        a blade assembly;
    a control unit including:
      a processing unit; and
      a display unit;
    a rpm sensor;
    a power supply adapted to supply electrical power to the motor, the processing unit and the display unit;
  determining a reproducible minimum rpm value for the sample comprising:
    adding an amount of a proppant to the sample to form a slurry;
    mixing the slurry at a mixing rpm value for a mixing period;
    reducing the mixing rpm value to a hold rpm value for a hold period;
    after the hold period, reducing the hold rpm value to a rpm value at which the proppant visually settles;
    increasing the rpm value to fluidize the settled proppant;
    reducing the rpm value to a minimum rpm value that prevents proppant settling; and
    repeating the increasing the rpm value and the reducing the rpm value steps until the minimum rpm value is reproducible resulting in the determination of the reproducible minimum rpm value.

2. The method of claim 1, further comprising:
  converting the reproducible minimum rpm value into a shear rate;
  calculating a fluid velocity from the calculated shear rate;
  calculating a pump rate from the fluid velocity; and
  calculating a maximum fracture width value from a sample viscosity data and the calculated pump rate.

3. The method of claim 2, further comprising:
  determining a reproducible minimum rpm value of a sample of a plurality of fracturing fluids, each of the fracturing fluids includes a different additive composition; and
  comparing the reproducible minimum rpm values of the samples of the plurality of fracturing fluids.

4. The method of claim 3, further comprising:
  calculating a fracture shear rate from the calculated velocity and the calculated maximum fracture width values of each of the samples of the plurality of fracturing fluids; and
  comparing the calculated fracture shear rates to reproducible minimum shear rates of the each of the samples of the plurality of fracturing fluid to determine if the proppant remains suspended in each of the plurality of fracturing fluids while each of the plurality of fracturing fluid moves into the fracture.

5. The method of claim 2, further comprising:
  calculating a fracture shear rate from the calculated velocity and the calculated maximum fracture width value of the sample; and
  comparing the calculated fracture shear rate to a reproducible minimum shear rate of the sample to determine if the proppant would remain suspended in the fracturing fluid while the fracturing fluid moves into fractures during fracturing operations.

6. The method of claim 2, further comprising:
  determining a reproducible minimum rpm value and a calculated maximum fracture width value of a sample of each of a plurality of fracturing fluids, each of the plurality of fracturing fluids including a different additive composition; and
  comparing the reproducible minimum rpm values and the calculated maximum fracture width values of the samples of the plurality of fracturing fluids to determine a particular sample from the samples of the plurality of fracturing fluids, wherein the particular sample has a lowest minimum rpm value and a highest calculated maximum fracture width value from the plurality of fracturing fluids, which represents a fracturing fluid with improved proppant transport properties for a set of downhole conditions of a specific well.

7. The method of claim 1, wherein the determining step further comprises:

after the slurry mixing step, increasing the mixing rpm value to a high shear rpm value for a high shear period; and after the increasing the rpm value step, measuring fluid properties to determine if the fluid properties have deteriorated, wherein, in the mixing rpm value reducing step, the mixing rpm value comprises the high shear rpm value, and wherein the mixing rpm value for the mixing period, the high shear rpm value for the high shear period, and the hold rpm value for the hold period comprise a simulated high shear history designed to mimic a high shear history encountered by the fracturing fluid being pumped down a tubular member and into a formation under downhole conditions including high temperature downhole conditions.

8. The method of claim 7, wherein the determining step further comprises:

adjusting the high shear rpm value and the high shear period; and repeating the determining step, until the reproducible minimum rpm value and a calculated maximum fracture width value correspond to downhole conditions so that the simulated fracturing fluid properties correspond to actual well downhole conditions.

9. The method in claim 7, wherein the high shear rpm value and the high shear period are determined by:

converting a treatment pump rate of a fracture treatment of a formation to be stimulated into a treatment fluid velocity as the fracturing fluid travels through a treatment tubular member;

calculating the high shear period from a length of the treatment tubular member and the treatment fluid velocity;

calculating a treatment shear rate from the treatment fluid velocity and a tubular member internal diameter; and converting the shear rate to the high shear rpm value.

10. The method of claim 1, further comprising:

determining a reproducible minimum rpm value of a sample of a plurality of fracturing fluids, each of the plurality of fracturing fluids including a different additive composition; and comparing the reproducible minimum rpm values of the samples of the plurality of fracturing fluids to determine a particular sample from the samples of the plurality of the fracturing fluids, wherein the particular sample has the lowest reproducible minimum rpm value from the plurality of fracturing fluids, which represents a fracturing fluid with improved proppant transport properties for a set of downhole conditions of a specific well.

11. A method comprising:

hydrating a sample of a fracturing fluid at room temperature at a hydrating rpm value for a hydrating period in a blender apparatus comprising:

a blender unit including:

a base unit having:
a motor;
a jar unit including:
a jar;
a base; and
a blade assembly;
a control unit including:
a processing unit; and
a display unit;
a rpm sensor; and
a power supply adapted to supply electrical power to the motor, the processing unit and the display unit;

determining a reproducible minimum rpm value comprising:

adding an amount of a proppant to the sample to form a slurry;

mixing the slurry at a mixing rpm value for a mixing period;

increasing the mixing rpm value to a high shear rpm value for a high shear period to mimic a high shear history encountered by a fracturing fluid being pumped down a tubular member and into a formation to be fractured;

after the high shear period, reducing the high shear rpm value until the proppant visually settles in the bottom of the jar;

fluidizing the settled proppant by increasing a rpm value;

reducing the rpm value to a minimum rpm value that just prevents proppant settling; and repeating the fluidizing step until the minimum rpm value is reproducible resulting in the determination of the reproducible minimum rpm value.

12. The method of claim 11, further comprising:

converting the reproducible minimum rpm value into a shear rate;

calculating a fluid velocity from the calculated shear rate;

calculating a pump rate from the fluid velocity; and calculating a maximum fracture width value from a sample viscosity data and the calculated pump rate.

13. The method of claim 12, further comprising:

repeating the determining step to determine a reproducible minimum rpm value of each of a sample of a plurality of fracturing fluids, each of the plurality of fracturing fluids including a different additive composition; and comparing the reproducible minimum rpm values of the samples of the plurality of fracturing fluids.

14. The method of claim 13, further comprising:

repeating the calculating step to calculate a calculated maximum fracture width value for each of the samples of the plurality of fracturing fluids; and comparing the calculated maximum fracture width values of the samples of the plurality of fracturing fluids.

15. The method of claim 12, wherein the determining step further comprises:

after the mixing step, reducing the mixing rpm value to a hold rpm value for a hold period or after the increasing step, reducing the high shear rpm value to a hold rpm value for a hold period;

after the increasing step, measuring fluid properties to determine if the fluid properties have deteriorated, wherein the mixing rpm value for the mixing period, the high shear rpm value for the high shear period, and the hold rpm value for the hold period comprise a simulated high shear history designed to mimic a high shear history encountered by the fracturing fluid being pumped down a tubular member and into a formation under downhole conditions including high temperature downhole conditions.

16. The method of claim 15, wherein the determining step further comprises:
adjusting the high shear rpm value and the high shear period; and
repeating the determining step, until the minimum rpm value and the calculated maximum fracture width value correspond to actual well downhole conditions.

17. The method of claim 11, wherein the determining step further comprises:
measuring the minimum rpm value of each sample of a plurality of fracturing fluids, each of the plurality of fracturing fluids including a different additive composition; and
comparing the minimum rpm values of each of the samples of the plurality of fracturing fluids to determine a particular sample from the samples of the plurality of fracturing fluids,
wherein the particular sample has a lowest minimum rpm value from the plurality of fracturing fluids, which represents a fracturing fluid with improved proppant transport properties for a set of downhole conditions of a specific well.

18. The method of claim 12, further comprising:
measuring the minimum rpm value and the calculated maximum fracture width values of each of the samples of the plurality of fracturing fluids, each of the plurality of fracturing fluids including a different additive composition; and
comparing the minimum rpm values and the calculated maximum fracture width values of the samples of the plurality of fracturing fluids to determine a particular sample from the samples of the plurality of the fracturing fluids,
wherein the particular sample has a lowest minimum rpm value and a highest calculated maximum fracture width value from the plurality of fracturing fluids, which represents a fracturing fluid with improved proppant transport properties for a set of downhole conditions of a specific well.

19. An apparatus comprising:
a blender unit including:
a base unit having:
a motor;
a jar unit including:
a jar;
a base; and
a blade assembly;
a control unit including:
a processing unit; and
a display unit;
a rpm sensor; and
a power supply adapted to supply electrical power to the motor, the processing unit and the display unit,
wherein the processing unit is configured to:
convert a reproducible minimum rpm value into a shear rate;
calculate a fluid velocity from the calculated shear rate;
calculate a pump rate from the fluid velocity;
calculate a maximum fracture width value from a sample viscosity data and the calculated pump rate; and
calculate a fracture shear rate from the calculated fluid velocity and the calculated maximum fracture width value of the sample;
convert a treatment pump rate of a fracture treatment of a formation to be stimulated into a treatment fluid velocity as the fracturing fluid travels through a treatment tubular member;
calculate a high shear period from a length of the treatment tubular member and the treatment fluid velocity;
calculate a treatment shear rate from the treatment fluid velocity and a tubular member internal diameter; and
convert the shear rate to a high shear rpm value.

20. A method comprising:
hydrating a sample of each of a plurality of fracturing fluids, each of the plurality of fracturing fluids includes a different additive composition, in an apparatus comprising a vessel, a mixing unit, a control unit, a rpm sensor, and a power supply under hydrating conditions including a hydrating temperature, a hydrating rpm value, and a hydrating period;
for each of the samples, determining a reproducible minimum rpm value comprising:
adding an amount of a proppant to the sample to form a slurry;
mixing the slurry at a mixing rpm value for a mixing period;
increasing the mixing rpm value to a high shear rpm value for a high shear period;
after the high shear period, reducing the high shear rpm value to a rpm value where the proppant begins to visually settle;
increasing the rpm value to reform the slurry;
reducing the rpm value to a minimum rpm value, wherein minimum rpm value just prevents proppant settling;
repeating the rpm value reducing step until the minimum rpm value is reproducible resulting in the determination of the reproducible minimum rpm value;
converting the reproducible minimum rpm value into a shear rate;
calculating:
a fluid velocity from the calculated shear rate,
a pump rate from the fluid velocity, and
a maximum fracture width value from a sample viscosity data and the calculated pump rate;
comparing the reproducible minimum rpm values and the calculated maximum fracture width values of the samples of the plurality of fracturing fluids to determine a particular sample,
wherein the particular sample has a lowest minimum rpm value from the plurality of fracturing fluids, which represents a fracturing fluid with improved proppant transport properties.

21. The method of claim 20, wherein the determining step further comprises:
adjusting the high shear rpm value and the high shear period; and
repeating the determining step, until the minimum rpm value and the calculated maximum fracture width value correspond to actual well downhole conditions.

22. The method in claim 20, wherein the high shear rpm value and the high shear period are determined by:
converting a treatment pump rate for a fracture treatment of a formation to be stimulated into a treatment fluid velocity as the fracturing fluid travels through a treatment tubular member;
calculating the high shear period from a length of the treatment tubular member and the treatment fluid velocity;

calculating a treatment shear rate from the treatment fluid velocity and a tubular member internal diameter; and converting the shear rate to the high shear rpm value.

23. The method of claim 20, further comprising:

calculating a fracture shear rate from the calculated velocity and the calculated maximum fracture width values of each of the samples of the plurality of fracturing fluids; and comparing the calculated fracture shear rates to a reproducible minimum shear rates of the samples of the plurality of fracturing fluid to determine if the proppant would remain suspended in each of the plurality of fracturing fluids while each of the plurality of fracturing fluids moves into a fracture.

24. An apparatus comprising:

a vessel, a mixing unit, a control unit having a processing unit, a rpm sensor, and a power supply, wherein the processing unit is configured to:

convert a reproducible minimum rpm value into a shear rate;

calculate a fluid velocity from the calculated shear rate;

calculate a pump rate from the fluid velocity;

calculate a maximum fracture width value from a sample viscosity data and the calculated pump rate; and calculate a fracture shear rate from the calculated fluid velocity and the calculated maximum fracture width value of the sample;

convert a treatment pump rate of a fracture treatment of a formation to be stimulated into a treatment fluid velocity as the fracturing fluid travels through a treatment tubular member;

calculate a high shear period from a length of the treatment tubular member and the treatment fluid velocity;

calculate a treatment shear rate from the treatment fluid velocity and a tubular member internal diameter; and convert the shear rate to a high shear rpm value.

* * * * *